US011035810B2

(12) United States Patent
Gupta et al.

(10) Patent No.: US 11,035,810 B2
(45) Date of Patent: *Jun. 15, 2021

(54) MESOSCALE SYSTEM FEEDBACK-INDUCED DISSIPATION AND NOISE SUPPRESSION

(71) Applicant: The Board of Trustees of the Leland Stanford Junior University, Palo Alto, CA (US)

(72) Inventors: Chaitanya Gupta, San Carlos, CA (US); Ross M. Walker, Salt Lake City, UT (US); Boris Murmann, Stanford, CA (US); Roger T. Howe, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 215 days.

This patent is subject to a terminal disclaimer.

(21) Appl. No.: 16/096,893

(22) PCT Filed: Apr. 27, 2017

(86) PCT No.: PCT/US2017/029854
§ 371 (c)(1),
(2) Date: Oct. 26, 2018

(87) PCT Pub. No.: WO2017/189854
PCT Pub. Date: Apr. 27, 2017

(65) Prior Publication Data
US 2019/0137425 A1  May 9, 2019

Related U.S. Application Data

(60) Provisional application No. 62/328,798, filed on Apr. 28, 2016.

(51) Int. Cl.
*G01N 27/416* (2006.01)
*G01N 27/327* (2006.01)
(Continued)

(52) U.S. Cl.
CPC ....... *G01N 27/028* (2013.01); *G01N 27/3273* (2013.01); *G01N 27/416* (2013.01); *G01N 27/49* (2013.01)

(58) Field of Classification Search
CPC ............ G01N 27/327; G01N 27/3273; G01N 27/333; G01N 27/403; G01N 27/414; G01N 27/416
See application file for complete search history.

(56) References Cited

U.S. PATENT DOCUMENTS 4,227,988 A * 10/1980 Galwey ................. G01N 27/49
204/229.1
4,500,840 A    2/1985 Galwey
(Continued)

OTHER PUBLICATIONS

A.Y. Klimenko, "Note on invariant properties of a quantum system placed into thermodynamic environment," Physica A 398 (2014) 65-75 (Year: 2014).*
(Continued)

*Primary Examiner* — Alexander S Noguerola
(74) *Attorney, Agent, or Firm* — Thomas|Horstemeyer, LLP

(57) ABSTRACT

A high-gain and low-noise negative feedback control ("feedback control") system can detect charge transfer in quantum systems at room temperatures. The feedback control system can attenuate dissipative coupling between a quantum system and its thermodynamic environment. The feedback control system can be integrated with standard commercial voltage-impedance measurement system, for example, a potentiostat. In one aspect, the feedback control system includes a plurality of electrodes that are configured to
(Continued)

electrically couple to a sample, and a feedback mechanism coupled to a first electrode of the plurality of electrodes. The feedback mechanism is configured to detect a potential associated with the sample via the first electrode. The feedback mechanism provides a feedback signal to the sample via a second electrode of the plurality of electrodes, the feedback signal is configured to provide excitation control of the sample at a third electrode of the plurality of electrode.

16 Claims, 8 Drawing Sheets

(51) Int. Cl.
*G01N 27/02* (2006.01)
*G01N 27/49* (2006.01)

(56) References Cited

U.S. PATENT DOCUMENTS

| | | | |
|---|---|---|---|
| 5,198,771 A * | 3/1993 | Fidler | G05F 1/561 |
| | | | 204/230.1 |
| 5,466,356 A | 11/1995 | Schneider et al. | |
| 6,008,059 A | 12/1999 | Schrier et al. | |
| 7,470,352 B2 | 12/2008 | Eversmann et al. | |
| 8,133,369 B2 | 3/2012 | Tam | |
| 8,845,870 B2 | 9/2014 | Noble et al. | |
| 9,285,336 B2 | 3/2016 | Gupta | |
| 2004/0120185 A1 | 6/2004 | Kang et al. | |
| 2008/0036444 A1 | 2/2008 | Paulus et al. | |
| 2011/0108422 A1 | 5/2011 | Heller et al. | |
| 2012/0091011 A1 | 4/2012 | Graham et al. | |
| 2012/0142026 A1 | 6/2012 | Miller et al. | |
| 2013/0051115 A1 | 2/2013 | En et al. | |
| 2013/0158378 A1 | 6/2013 | Berger et al. | |
| 2014/0043049 A1 | 2/2014 | Gupta | |
| 2016/0161438 A1 | 6/2016 | Gupta | |

OTHER PUBLICATIONS

Hsu et al., "Modeling electronic coupling in excitation energy transfer," online Advanced Science News, Oct. 9, 2013. Downloaded from https://www.advancedsciencenews.com/modeling-electronic-coupling-in-excitation-energy-transfer/on Jul. 23, 2020. (Year: 2013).*
International Search Report from PCT/US/2017/029854, dated Sep. 26, 2017.
E. Verhagen; et al, "Quantum-Coherent Coupling of a Mechanical Oscillator to an Optical Cavity Mode." Nature 482, 63 (2012).
Ch. Roos; et al, "Quantum State Engineering on an Optical Transition and Decoherence in a Paul Trap" Physical Review Letters 83, 4713 (1999).
O. Gywat; et al, "Optical Detection of Single-Electron Spin Decorherence in a Quantum Dot" Physical Review B 69, 205303 (2004).
T. Böttger; et al, "Effects of Magnetic Field Orientation on Optical Decoherence in Er3+: Y2 SiO5" Physical Review B 79, 115104 (2009).
W. H. Zurek, "Preferred States, Predictability, Classicality and the Environment-Induced Decoherence" Progress of Theoretical Physics 89, 281 (1993).
P. W. Shor, "Scheme for Reducing Decoherence in Quantum Computer Memory" Physical Review A 52, R2493 (1995).
D. Kielpinski; et al, "A Decoherence-Free Quantum Memory Using Trapped Ions" Science 291, 1013 (2001).
L. C. L. Hollenberg; et al, "Charge-Based Quantum Computing Using Single Donors in Semiconductors" Physical Review B 69, 113301 (2004).
A. Montina and F. T. Arecchi, "Quantum Decoherence Reduction by Increasing the Thermal Bath Temperature" Physical Review Letters 100, 120401 (2008).
E. Collini and G. D. Scholes, "Coherent Intrachain Energy Migration in a Conjugated Polymer at Room Temperature" Science 323, 369 (2009).
M.Wilde; et al, "Could Light Harvesting Complexes Exhibit Non-Classical Effects at Room Temperature?" Proceedings of the Royal Society A 466, 1347 (2010).
S. Hoyer; et al, "Limits of Quantum Speedup in Photosynthetic Light Harvesting" New Journal of Physics 12, 065041 (2010).
G. Panitchayangkoon;et al, "Long-Lived Quantum Coherence in Photosynthetic Complexes at Physiological Temperature" Proceedings of the National Academy of Sciences 107, 12766 (2010).
R. Kubo, "The Fluctuation-Dissipation Theorem" Reports on Progress in Physics 29, 255 (1966).
P. Ullersma, "An Exactly Solvable Model for Brownian Motion" Physica 32, 27 (1966).
G. W. Ford; et al, "Statistical Mechanics of Assemblies of Coupled Oscillators" Journal of Mathematical Physics 6, 504 (1965).
M. Poggio; et al, "Feedback Cooling of a Cantilever's Fundamental Mode below 5 mK" Physical Review Letters 99, 017201 (2007).
P. F. Cohadon; et al, "Cooling of a Mirror by Radiation Pressure" Physical Review Letters 83, 3174 (1999).
D. Kleckner and D. Bouwmeester, "Sub-Kelvin Optical Cooling of a Micromechanical Resonator" Nature 444, 75 (2006).
S. Mancini; et al, "Optomechanical Cooling of a Macroscopic Oscillator by Homodyne Feedback" Physical Review Letters 80, 688 (1998).
C. H. Metzger and K Karrai, "Cavity Cooling of a Microlever" Nature 432, 1002 (2004).
J. S. Briggs and A. Eisfeld, "On the Equivalence of Quantum and Classical Coherence in Electronic Energy Transfer" Physical Review E 83, 051911 (2011).
J.S. Briggs and A. Eisfeld, "Quantum Dynamics Simulation with Classical Oscillators" in arXiv:1309.1746 [quant-ph], (2013).
R. A. Marcus, "On the Theory of Oxidation-Reduction Reactions Involving Electron Transfer." Journal of Chemical Physics 24, 966 (1956).
R. J. Glauber, "Coherent and Incoherent States of the Radiation Field" Physical Review 131, 2766 (1963).
H. Nyquist, "Thermal Agitation of Electric Charge in Conductors" Physical Review 32, 110 (1928).
K. W. Ford and J. A. Wheeler, "Application of Semiclassical Scattering Analysis" Annals of Physics 7, 287 (1959).
T. Pellizzari;et al, "Decoherence, Continuous Observation, and Quantum Computing: A Cavity QED Model" Physical Review Letters 75, 3788 (1995).
J. R. Senitzky, "Dissipation in Quantum Mechanics. The Harmonic Oscillator" Physical Review 119, 670 (1960).
S. Howard and S. K. Roy, "Coherent States of a Harmonic Oscillator" American Journal of Physics 55, 1109 (1987).
Tarlov; et al. "Electron-Transfer Reaction of Cytochrome c Absorbed on Carboxylic Acid Terminated Alkanethiol Monolayer Electrodes" (J. Am. Chem. Soc. 113, 1847-1849) (Year: 1991).
Yoo; et al. "Dielectric Properties of On-Chip-Cured Polyimide Films" Thin Solid Films, 518, 5986-5991 (Year: 2010).
W. H. Zurek, "Decoherence, Einselection, and the Quantum Origins of the Classical" Reviews of Modern Physics 75, 715 (2003).
Michael D. M. Dryden et al: "DStat: A Versatile, Open-Source Potentiostat for Electroanalysis and Integration", PLOS ONE, vol. 10, No. 10, Oct. 28, 2015 (Oct. 28, 2015).
Blanco J R et al: 11 Design of a Low-Cost Portable Potentiostat for Amperometric Biosensors 11, IEEE Instrumentation and Measurement Technology Conference (IEEE CAT. No. 06CH3.

* cited by examiner

MESOSCALE SYSTEM FEEDBACK-INDUCED DISSIPATION AND NOISE SUPPRESSION

RELATED APPLICATION

This application is the 35 U.S.C. § 371 national stage entry of PCT/US2017/029854, filed Apr. 27, 2017, and claims the benefit of priority under 35 U.S.C. § 119(e) to U.S. Provisional Patent Application No. 62/328,798, filed Apr. 28, 2016, titled "MESOSCALE SYSTEM FEEDBACK-INDUCED DISSIPATION AND NOISE SUPPRESSION," the entire disclosure of both of which applications are hereby expressly incorporated herein by reference.

STATEMENT REGARDING FEDERALLY SPONSORED RESEARCH OR DEVELOPMENT

This invention was made with government support under contract N66001-11-1-4111 awarded by the Defense Advanced Research Projects Agency. The government has certain rights to the invention.

TECHNICAL FIELD

The subject matter described herein relates to detection of analytes.

BACKGROUND

A potentiostat is commonly used in electrochemical experiments to probe properties of a physical system, for example, an electrochemical interface between a solid and liquid phase. A potentiostat employs a three electrode system comprising a reference electrode, a working electrode and a counter electrode. The potentiostat can operate by maintaining a fixed potential difference between a working electrode and a reference electrode and measuring the current that flows through the electrolyte and across the electrode-electrolyte interface via the counter electrode. For example, in bulk electrolysis experiments, a potentiostat can be used to measure the total charge that has transferred across an electrochemical interface at a fixed potential difference. The measured charge can be indicative of the reduction/oxidation reaction at the interface.

The physical system (e.g., electrode-electrolyte interface) probed by the potentiostat can include systems that exhibit quantum properties, e.g., transport properties associated with mesoscale phenomena. However, coupling of the quantum systems with their environment (e.g., surrounding thermodynamic bath) at room temperatures can lead to onset of classical behavior in quantum systems. Traditional potentiostats are limited in their ability to detect quantum properties at room temperature in electrochemical systems due to, for example, introduction of external noise (e.g., voltage noise) into the quantum system due to coupling with the electronic system, dissipation forces acting on the quantum system, etc. As a result, quantum phenomena and mesoscale phenomena (phenomena that lie in between the classical and quantum-mechanical regimes of behavior) cannot be detected by traditional potentiostats. Detection of mesoscale properties can be important for novel sensing, timing and communication paradigms. Therefore, it is desirable to develop a potentiostat that can detect and quantify mesoscale phenomena.

SUMMARY

This application provides for a high-gain and low-noise negative feedback control system that allows for detection of quantum mechanical signatures of analytes at room temperature. This can be done by dissipation reduction and noise suppression in charge transfer process in a mesoscale system that includes the analytes.

Accordingly, in one aspect, the invention provides for systems that include at least:
(a) a plurality of electrodes configured to electrically couple to a sample; and
(b) a feedback mechanism coupled to a first electrode of the plurality of electrodes and configured to detect a potential associated with the sample via the first electrode, wherein the feedback mechanism provides a feedback signal to the sample via a second electrode of the plurality of electrodes, the feedback signal configured to provide excitation control of the sample at a third electrode of the plurality of electrodes. In another aspect, the sample is a molecular-scale charge transfer system. In another aspect, the feedback signal provides excitation control of the molecular-scale charge transfer system during electronic excitation transfer (EET) in the molecular-scale charge transfer system. In any of the aspects above and herein, the excitation control attenuates dissipation in the molecular-scale charge transfer system from a surrounding thermodynamic bath. In any of the aspects above and herein, the excitation control can reduces dissipative coupling of one or more vibronic energy levels in the molecular-scale charge transfer system to an external bath. In any of the aspects above and herein, the first, second and third electrodes are a reference electrode, a counter electrode and a working electrode of a potentiostat, respectively. In any of the aspects above and herein the feedback mechanism can include a first negative-feedback amplifier configured to generate a first signal based on a difference between the detected potential and a set potential value. In any of the aspects above and herein, the feedback mechanism can include a second negative feedback amplifier configured to receive the first signal and generate the feedback signal. In any of the aspects above and herein, the system can include a current detection system configured to detect a current associated with the second electrode. In any of the aspects above and herein, the detected current is indicative of an analyte in the molecular-scale charge transfer system.

In one aspect, the invention provides for methods of analyte detection that include at least: (a) detecting, by a feedback mechanism via a first electrode of a plurality of electrodes, a potential associated with a sample. The plurality of electrodes can be electrically coupled to the sample; (b) generating, by the feedback mechanism, a feedback signal; and (c) providing the feedback signal to the sample via a second electrode of the plurality of electrodes. The feedback signal can be configured to provide excitation control of the sample at a third electrode of the plurality of electrode. In another aspect, the sample is a molecular-scale charge transfer system. In another aspect, the feedback signal provides excitation control of the molecular-scale charge transfer system during electronic excitation transfer (EET) in the molecular-scale charge transfer system. In any of the aspects above and herein, the excitation control attenuates dissipation in the molecular-scale charge transfer system from a surrounding thermodynamic bath. In any of the aspects above and herein, the excitation control attenuates dissipation in the molecular-scale charge transfer system from a surrounding thermodynamic bath. In any of the aspects above and herein, the excitation control can reduces dissipative coupling of one or more vibronic energy levels in the molecular-scale charge transfer system to an external bath. In any of the aspects above and herein, the first, second and third electrodes are a reference electrode, a counter electrode and a working electrode of a potentiostat, respectively. In any of the aspects above and herein the feedback mechanism can include a first negative-feedback amplifier configured to generate a first signal based on a difference between the detected potential and a set potential value. In any of the aspects above and herein, the feedback mechanism can include a second negative feedback amplifier configured to receive the first signal and generate the feedback signal. In any of the aspects above and herein, the system can include a current detection system configured to detect a current associated with the second electrode. In any of the aspects above and herein, the detected current is indicative of an analyte in the molecular-scale charge transfer system.

DETAILED DESCRIPTION

Figure 1:
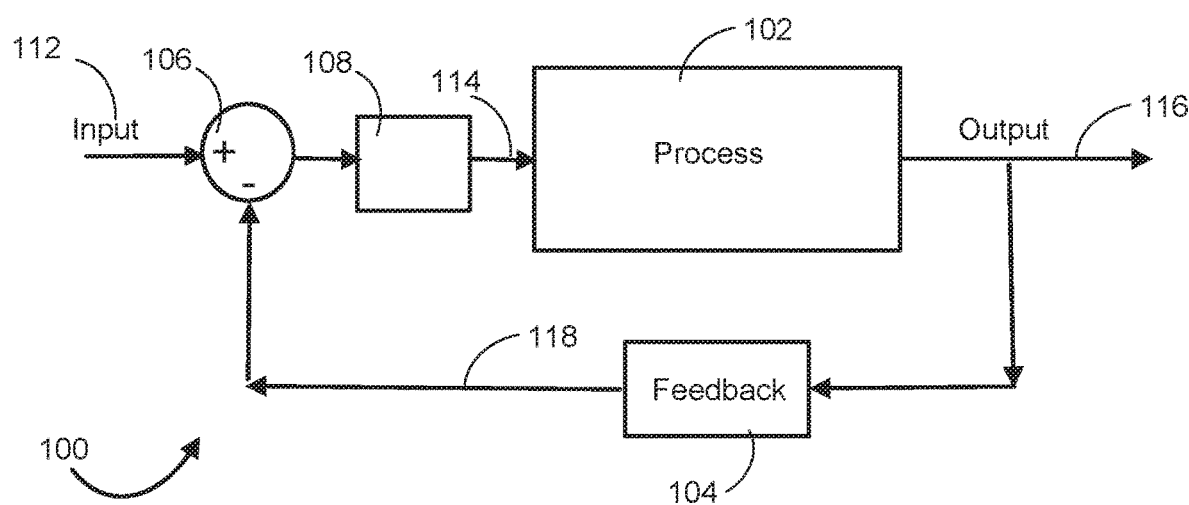
FIG. 1 illustrates an implementation of a feedback system for a process.

A high-gain and low-noise negative feedback control (hereinafter "feedback control") system can detect quantum mechanical signatures in charge transfer occurring within quantum systems at room temperatures. The feedback control system can attenuate dissipative coupling between a quantum system (e.g., vibrionic energy levels) and its thermodynamic environment by suppressing intrinsic energy fluctuations (e.g., fluctuation in electric fields) associated with the quantum system. The dissipative coupling, which can be prominent at room temperatures, can hinder the detection of quantum phenomena (e.g., transport properties associated with mesoscale phenomena). Measurement architectures with low noise feedback control system can detect quantum phenomenon at room temperature that may not be observed using traditional measurement devices and techniques.

The feedback control system can be integrated with standard commercial voltage-impedance measurement system, for example, a potentiostat. A standard potentiostat has a three electrode circuit topology, and can measure electrical properties of an electrochemical system. The electrochemical system can include an electrode (e.g., metallic or semiconducting), an electrolyte (e.g., an aqueous solvent, an organic solvent, etc.), a buffering salt, components of a testing sample (e.g., a complex matrix), one or more analyte species, redox species that can serve as charge source or sink to facilitate charge exchange with the electrode, etc. The redox species can include, for example, ferro-/ferricyanide couple, ferrocenium ion and ruthenium hexaamine complex. The analytes can include, for example, whole microorganisms or components thereof including DNA, RNA oligomers, peptide fragments, proteins, glycans, polysaccharides, metabolites etc. The three electrode circuit topology includes a counter electrode, a working electrode, and a reference electrode which can be electrically coupled to the electrochemical system.

The feedback control system can be integrated with a potentiostat, and can control the potential and/or current at one or more of the three electrodes. The feedback control system can be configured to control the potential of the electrochemical system (e.g., by setting it to a desired value) and/or suppress the voltage noise in the electrochemical system. It can detect the potential of the electrochemical system (e.g., at the reference electrode) and send a corrective feedback signal (e.g., current signal, voltage signal) to alter the potential and/or reduce voltage noise associated with the electrochemical system. The corrective feedback signal can also alter the electronic exchange process at the working electrode. The feedback control system can include one or more high gain amplifiers, which in some implementations, can be cascaded together. The feedback system can also include a voltage buffer that allows for the detection of the potential with minimal effect to the electrochemical system. For example, the impedance of the voltage buffer from the point of view of the electrochemical system can be very high. This can prevent current from the electrochemical system from flowing into the voltage buffer. As a result, potential of the electrochemical system can be detected with minimal perturbation on the electrochemical system.

Suppression of voltage noise of the electrochemical system can result in suppression of energy fluctuations of the quantum electrochemical system (e.g., in the vicinity of an interface between the electrolyte and a working electrode). This can result in efficient resonant charge transfer between, for example, the electrolyte-dissolved redox species and the working electrode (e.g., charge transfer between discrete electronic energy levels of vibration-dressed electronic states in the redox species of the molecular charge transfer system, and energy levels in the working electrode). The feedback control system can limit the multiple scattering contributions from the thermodynamic bath modes which can result in resonant charge transfer.

Due to the suppression of voltage noise and the resulting fluctuations in the electric field at the electrode-electrolyte interface (e.g., interface between the electrochemical system and the working electrode), the effect of analytes on the charge transfer process between the redox species and the working electrode can be detected. For example, the charge transfer process can be modified by the vibrational structure of the analytes, which can be discerned from the perturbative effect of introducing the analyte on the electrode-electrolyte interface. By comparing the analyte-modified charge transfer process with a database containing information related to the effects of various analytes on charge transfer processes, the analyte can be detected Detection of analytes based on interaction of the analytes with a charge transfer process using a low noise potentiostatic feedback control system offers several advantages. For example, some implementations allow for label- and probe-free chemical/biological detection using information about the vibrational structure of the analyte targets. Further, analyte detection with vibrational mode information does not require ultra-low temperatures (sub 20K) and high vacuum (e.g., less than $10^{-5}$ Torr) environments. Analytes can be detected at ambient conditions. In some implementation, detection can happen over a large dynamic range (e.g., 1 pg/ml-1 ug/ml), with high sensitivity (e.g., less than 1 pg/ml lower limit of detection) and high specificity (e.g., close to 100%). This concept may be extended to other types of systems, for example, interface between combinations of solid state metal, semiconductor and insulator junctions.

In one aspect or one embodiment, FIG. 1 illustrates a standard feedback system 100 where the output for a process 102 is used to determine the input to the process in order to maintain a desired operation of the process 102. In FIG. 1, an output 116 of the process 102 is used to determine a feedback signal 118 by the feedback system 104. The feedback signal 118 can be used, along with the input signal 112 to determine the process input 114 for the process 102. Determination of the process input 114 can involve, for example, calculating the difference between the input signal 112 and the feedback signal 118, and amplifying the difference by a gain stage 108.

Figure 2:
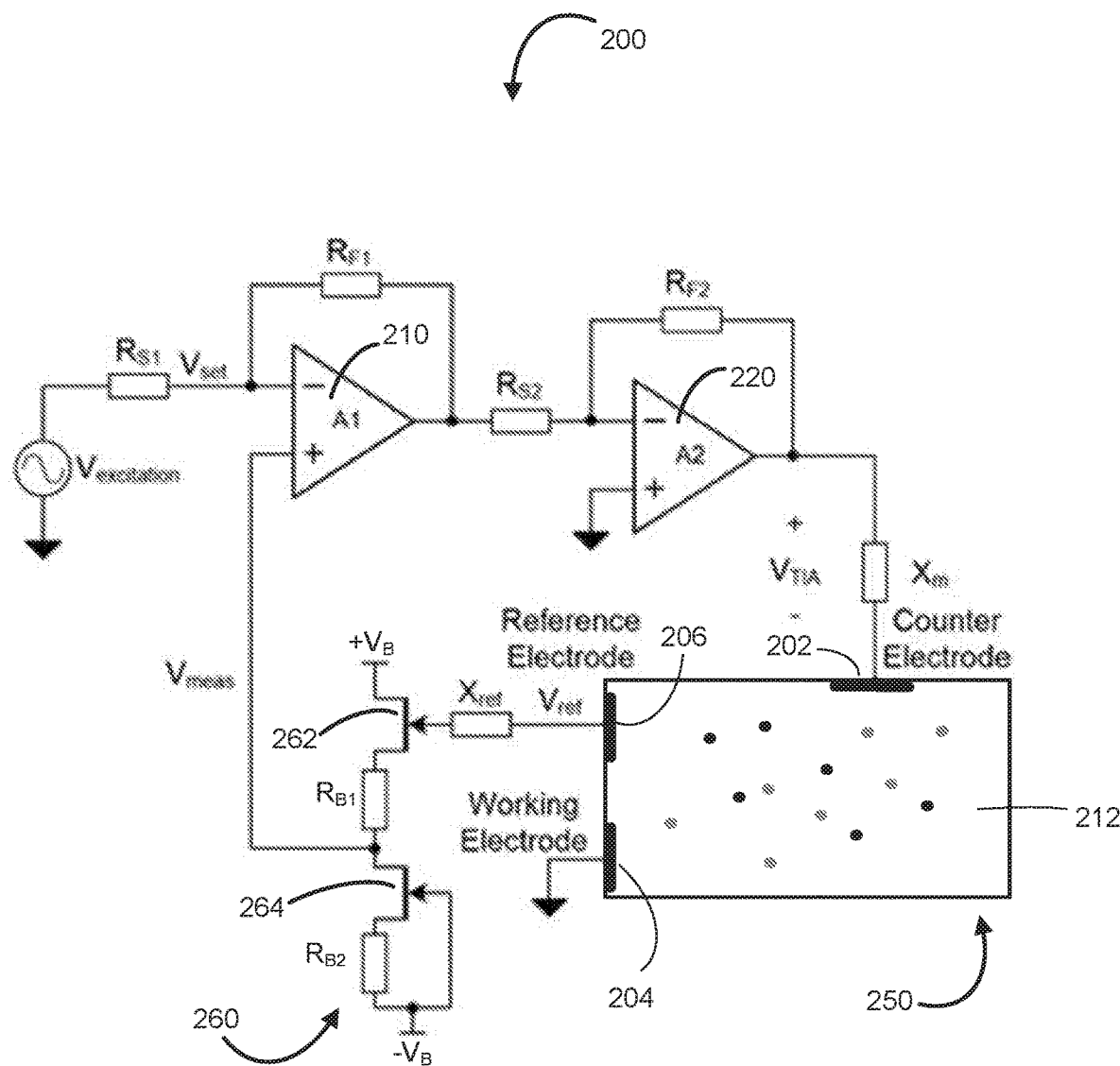
FIG. 2 illustrates an implementation of a potentiostat with a high-gain and low-noise feedback control system.

FIG. 2 illustrates an implementation of a potentiostatic apparatus 200 with a feedback control system coupled to an electrochemical system. The electrochemical system 250 can include molecular-scale charge transfer system (e.g., electrolyte 212 and electrode 204), and analytes contained in the electrolyte phase of the system (not shown). The potentiostatic apparatus 200 and the electrochemical system 250 can be electrically coupled via one or more of counter electrode 202, working electrode 204 and reference electrode 206. The potentiostatic apparatus 200 can apply a potential bias across the electrochemical system 250 (e.g., between reference electrode 206 and working electrode 204). The applied bias can result in charge transfer between the redox-active species in electrolyte 212 and the nanoscale working electrode 204. The exchange of electrons between the electrodes and the redox species can lead to an exchange of energy, and is referred to as electron energy transfer (EET). The transport of redox species in the electrochemical system 250 can complement the flow of electrons in the potentiostatic apparatus 200 and completes the charge flow circuit.

The current flowing into (or out) of the counter electrode 202 can be related to the exchange of electrons between the redox species and the working electrode 204, for example when the counter electrode is much larger in area than the working electrode and the current flow into the reference electrode 206 is small (e.g., zero). Therefore, measuring the current flowing into (or out) of the counter electrode can be indicative of the rate and nature of electron exchange at the working electrode 204 (or counter electrode 202). The current can be detected, for example, by measuring a voltage difference across an impedance (e.g., $X_m$) electrically coupled to the counter electrode 202. The voltage difference can be measured, for example, by using a low noise voltmeter or transimpedance amplifier chain. In some implementations, the rate of electron exchange at the working electrode 204 can be detected by measuring the current at the working electrode 204 (e.g., by measuring a voltage difference across impedance electrically coupled to the working electrode 204).

Electrons in the redox species can occupy vibration-dressed electronic energy states (also referred to as vibronic states). The electronic exchange between the vibronic states of redox species and the energy states in electrodes can be affected by the environment or thermodynamic bath (e.g., dielectric environment of the solvent). The electronic exchange process can also be affected by the presence of analytes (e.g., analytes present on or near the surface of the working electrodes) and the background matrix of the sample being tested. The interaction between the polarization modes of the analytes (e.g. slow moving vibrational modes of the analyte species) and the vibronic states of redox species can perturb the electronic exchange process, or and available electronic modes of the analytes can even directly participate in the electron exchange process between the redox species and the working electrode. The effect of the analyte on the electronic exchange process can be detected by measuring the charge exchange current at the working electrode (204) electrolyte (212) interface which can be measured at the counter electrode 202 (or working electrode 204) as described above. By measuring the current for various input voltages $V_{set}$, a current versus voltage (I-V) trace for the electrochemical interface 250 (which can include the effect of analyte) can be generated. Analytes in the electrochemical system 250 can be fingerprinted (e.g., their I-V trace determined) by quantifying the perturbation introduced by these analytes on the measured charge transfer flux at the interface.

Thermal disturbances in the electric field energy in proximity to the working electrode 204 can affect the electronic exchange process at the working electrode 204. Thermal disturbances can affect the electronic exchange process between the redox species and the electrodes, and therefore impede the determination of the analyte in the electrochemical system. For example, fluctuations in electric fields can be related, for example, proportionally to the dissipation forces acting on the electronic exchange process, which can obfuscate any resonant interactions present in the electrochemical system. The thermal disturbance in the electric field can arise due to the intrinsic electrostatic environment at the electrochemical interface or due to electronic noise injected from the biasing and current-measurement circuitry (e.g., from the reference electrode 206, counter electrode 202 etc.) coupled to the electrochemical system. Thermal disturbances can scale with the temperature of the system making the detection of analytes difficult at ambient conditions (for example, above 50 K).

A feedback control system in the potentiostatic apparatus 200 can mitigate the effect of thermal disturbances and dissipation, and therefore allow for the detection of analytes, for example, via resonant signatures in the electronic exchange process at room temperatures. The feedback control system can apply the desired bias across the electrochemical interface between the electrolyte 212 and the working electrode 204 utilizing negative feedback, and can suppress intrinsic and extrinsic sources of thermal disturbance.

As shown in FIG. 2, the feedback control system comprises a pair of ultra-low noise amplifiers 210 and 220 that are electrically coupled to the electrochemical system 250 via the counter electrode 202 and the reference electrode

206. The feedback control system detects the potential $V_{ref\_}$ of the redox active species in the electrolyte 212 at the reference electrode 206. $V_{ref}$ can be representative of the vibronic energy of the redox species in the charge transfer system 212.

In some implementations, the feedback control system can include a low noise voltage buffer 260 that can detect the potential $V_{ref}$ with minimal perturbation to the charge transfer system 212. This can be achieved, for example, by designing the voltage buffer 260 to have high impedance from the perspective of the charge transfer system 212. As shown in FIG. 2, the voltage buffer comprises cascaded field effect transistors 262 and 264 (e.g., pMOS, nMOS transistors). Transistor 262 (e.g., nMOS transistor) can be electrically connected to a voltage source with potential $+V_B$ at its drain, and to the reference electrode 206 (via the reference electrode impedance $X_{ref}$) at its gate. The drain of the transistor 264 (e.g., nMOS transistor) can be electrically connected to the source of the transistor 262 via an impedance $R_{B1}$. The source of the transistor 264 can be electrically connected to a voltage source with potential $-V_B$ via an impedance $R_{B2}$. Additionally, the gate of the transistor 264 can also be electrically connected to the voltage source with potential $-V_B$. The voltage buffer 260 can generate a voltage signal $V_{meas}$ (at the drain of the transistor 264) which represents the voltage $V_{ref}$ detected by the voltage buffer 260 at the reference electrode 206.

Pair of cascaded amplifiers 210 and 220 are configured to deliver a high gain, low noise corrective signal to the electrochemical system 250 via the counter electrode 202. The corrective signal is proportional to the difference between the potential $V_{set}$ (related to the desired potential of the electrochemical system 250) and the detected potential $V_{meas}$. Amplifier 210 has a gain of A1 and has two inputs: $V_{set}$ (at the inverting input) and $V_{meas}$ (at the non-inverting input). The output of the amplifier 210 is connected to the inverting input by a resistor $R_{F1}$. The output of the amplifier 210 can also be connected to an inverting input of a second amplifier 220 via resistor $R_{S2}$. The non-inverting input of the amplifier 220 can be connected to a ground potential. The output of the amplifier 220 can be connected to the inverting input of the amplifier 220 by a resistor $R_{F2}$. This arrangement of connecting the output of an amplifier (e.g., 210 and 220) to its inverting input is referred to as negative feedback. Cascaded negative feedback amplifiers (e.g., cascaded amplifiers 210 and 220) can provide high-gain to an input signal (e.g., difference between $V_{set}$ and $V_{meas}$) and improve the signal to noise ratio of the output signal. For example, the output of the amplifier 210 can be proportional to the difference between the set voltage $V_{set}$ and the measured voltage $V_{meas}$. The output of amplifier 220 can be proportional to the difference between the input at the inverting input (e.g., output of the amplifier 210) and the input at the non-inverting input (e.g., the ground potential value).

The cascaded amplifiers can control the potential of and/or current flowing into (or out) of the counter electrode 202. The output of the amplifier 220 (corrective feedback signal) can be electrically connected to the counter electrode 202 via impedance $X_M$. The corrective feedback signal can, for example, set the potential of the counter electrode 202 to a desired potential (e.g., proportional to $V_{set}$), inject a corrective current into the electrochemical system 250, etc. A corrective current signal flowing into (or out) of the counter electrode can be detected by measuring a potential $V_{TIA}$ across the impedance $X_M$ (e.g., by a voltmeter) and dividing the measured potential $V_{TIA}$ by the impedance $X_M$. As described before, by measuring the corrective current flowing into (or out) of the counter electrode for various input voltages $V_{set}$, a current versus voltage (I-V) graph can be generated. This I-V trace can contain the "fingerprint" of the analytes in the electrochemical system, and the identity of the analyte can be detected by comparing the detected I-V data with I-V data of other analytes.

An analyte (or multiple analytes) in an electrolyte can be detected by electrically coupling the electrochemical system (analyte and the electrolyte) to the potentiostatic apparatus 200 via the counter electrode 202, reference electrode 206 and working electrode 204. A user can set the voltage at the inverting input of the first amplifier 210 (e.g., by using a low noise tunable voltage source). The voltage buffer 260 can detect the voltage at the reference electrode without adding extrinsic noise and send a signal with a voltage value (related to the detected voltage) to the non-inverting input 210 of the first amplifier. Based on the two inputs the cascaded high-gain, low-noise negative feedback amplifiers (e.g., 210 and 220) send a corrective feedback signal (e.g., current signal) to the electrochemical system via the counter electrode. A feedback detection system in the potentiostatic apparatus 200 (e.g., a voltmeter, an ammeter, etc.) can detect the feedback signal. The feedback detection system can communicate with a control system (e.g., a computing device) that can record information related to the detected feedback. The control system can also control the value of the set voltage $V_{set}$. For example, the control system can sweep through series of values of the set voltage $V_{set}$, and record the corresponding feedback signal. The control system can generate a dataset of multiple set voltage values and the corresponding feedback signal (e.g., current). The control system can compare the generated dataset with datasets of feedback responses for other electrochemical systems (with different electrolytes, analytes, etc.), and determine the identity of the analyte in the electrochemical system at hand.

Figure 3:
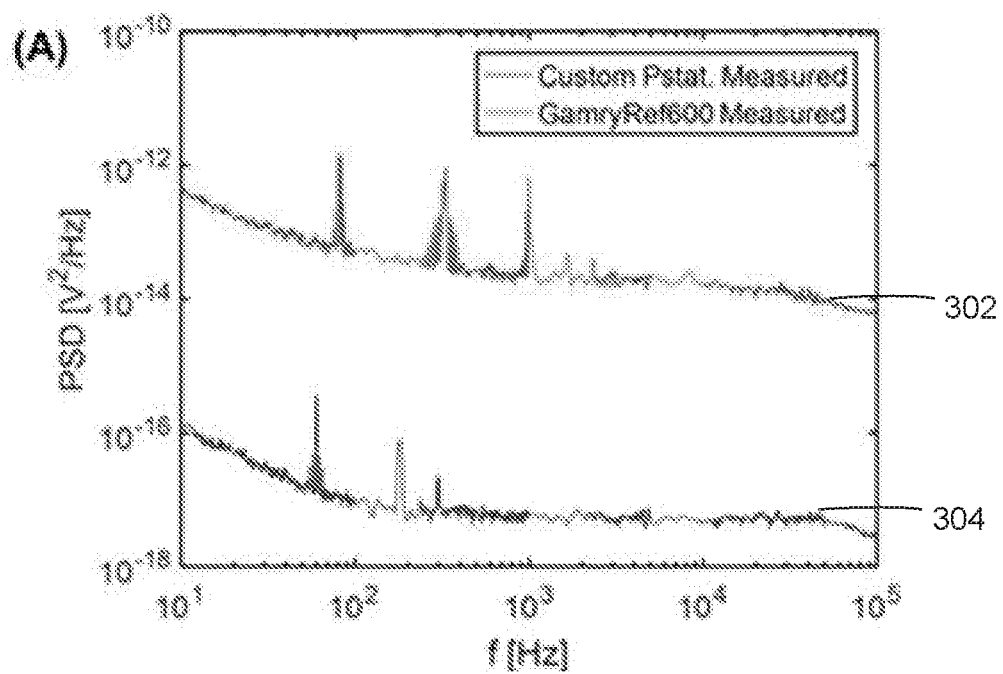
FIG. 3 illustrates the effect of high-gain and low-noise feedback circuit on the power spectral density (PSD) of voltage noise.

FIG. 3 illustrates the effect of high-gain and low-noise negative feedback circuit on the power spectral density (PSD) of voltage noise at the reference node of a potentiostatic apparatus 200. The PSD is indicative of the voltage noise at various frequencies. Plots 302 and 304 represent the PSD of voltage noise detected at a reference electrode of a potentiostat without and with the low noise feedback control, respectively. The potentiostat with low noise feedback (e.g., potentiostatic apparatus 200) has reduced PSD at the reference electrode by several orders of magnitude. The reduced fluctuations result in fewer thermal disturbances to the vibronic states of the redox active species in the electrolyte from the fluctuating electric field. In addition, the high gain of the low-noise feedback control system of the potentiostatic apparatus 200 can attenuate any dissipation from the thermodynamic bath acting on the electron transfer process at the electrochemical interface, in contrast to an off-the-shelf potentiostat.

Coupling between the energy levels involved in the electron transfer process (e.g., vibronic states of redox species, energy levels of the metal electrodes, etc.) with the thermodynamic environment and between themselves can be modeled by circuit elements (e.g., inductors, capacitors, resistors, etc.) described in FIGS. 4A, 4B, 7A and 7B. For example, a resistor (e.g., $X_r$ in FIGS. 4A and 4B, $R_1$ and $R_2$ in FIGS. 7A and 7B) represents dissipative coupling to the external environment and/or adds noise related to thermal fluctuations (e.g., voltage noise) to the energy levels, which are themselves represented by the reactances (capacitances and inductances). The circuit elements (e.g., resistors, inductors and capacitors) dictate the electrostatic relaxation of the electrochemical interface in response to a time-varying voltage bias, which is usually separable from the much faster dynamics of the nuclear and electronic modes of the system. It can be demonstrated that for a high-gain and low-noise negative feedback control system, the dissipative coupling of the participant energy states (e.g., vibronic modes of redox species) with the environment can attenuated when the time scale of the feedback response is comparable to the relaxation time-scale of the electrochemical interface. For example, as demonstrated in Equations 7.1a and 7.1b, for high-gain (e.g., high value of the product of $A_1 A_2$) the terms in the denominator of Equations 7.1a and 7.1b that have the damping kernel $\gamma_{11}$ tend to zero. This suggests that for high-gain, damping in the electron transfer process is attenuated.

The preservation of the superposition of quantum probability amplitudes requires reduced interactions between the system and bath, or a reduction in the number of bath modes that can interact with the system, for the case when the quantum system is coupled to a large number of modes. A scheme for preserving interferences between states would enable new room temperature systems exhibiting quantum behavior that could be applied to sensing, computing, and energy conversion. As an example, persistent quantum coherent interferences of exciton waves are thought to boost the efficiency of EET processes, and by extension, the efficiency of an EET transport-mediated photosynthetic process.

In the context outlined above, the embodiments described herein are directed to excitation control of mesoscale charge transfer system with a classical electronic negative feedback loop. The embodiments can prolong the resonant interactions between the electronic and vibrational modes in the electrochemical system. An environment-coupled molecular system that is comprised of a single level donor and acceptor species, 'dressed' by a collective of bath vibrational modes, is used to model the charge transfer process. This leads to an equivalent circuit model in which the dynamical variables describe wavefunction probability amplitudes. The impact of feedback on wavefunction probability amplitudes can then be described in terms of the dynamical variables of the circuit model.

"Meso"-scale properties in devices are usually observed at ultra-low temperatures and in high vacuum type environments, and these unique properties can enable novel applications in many industries including timing references, memory, communications and sensing. However, these meso-structures are relatively unsuitable for practical deployment because these properties manifest only for an idealized set of conditions, and there is tremendous overhead needed to realize these idealized conditions. With the feedback topology described herein, these properties can be realized at room temperatures and in "dirty" systems, making these devices a practical reality. The proposed topology can be easily scaled, thus minimizing the space and energy overhead for realizing such systems.

The equations of motion for a one dimensional particle (system) coupled to a bath of damping vibrational modes are given by:

$$\dot{x}(t) = \frac{p(t)}{m} \text{ and} \quad (1.1)$$

$$\dot{p}(t) = -V'(x) - \int_0^t \frac{\bar{\gamma}(t-t')p(t')}{m} dt' + \bar{\xi}(t), \quad (1.2)$$

where $\bar{\gamma}$ is the damping kernel, and m, $k_B$, T, and V(x) are the system mass, Boltzmann constant, bath temperature and conservative potential, respectively. $\bar{\xi}(t)$ is a Gaussian function with zero mean and correlation given by $\langle \bar{\xi}(t)\bar{\xi}(0)\rangle = mk_B T \text{ Re } \bar{\gamma}(t)$ in the classical limit.

Thus, the amplitude of thermal disturbance acting on the system is related to the dissipative force exerted by the environment, subject to the assumption that the thermal reservoir is large enough such that the bath vibrational modes continue to stay in equilibrium throughout their interaction with the system. These equations of motion are derived from the Hamiltonian description of the system and the environment, in which the environment is modeled as a collection of non-interacting harmonic oscillators (h.o.) and the interaction between the system and the environment is bilinear in the environment h.o coordinates and the system coordinate, as shown below:

$$H = H_{sys} + H_{env} + H_i \quad (2)$$

$$= \frac{p^2}{2m} + V(x) + \sum_\alpha \frac{p_\alpha^2}{2m_\alpha} + \frac{m_\alpha \omega_\alpha^2}{2}\left(q_\alpha + \frac{c_\alpha}{m_\alpha \omega_\alpha^2}x\right)^2,$$

where in addition to the interaction term, $$x\sum_\alpha c_\alpha q_\alpha,$$

there is a compensation term, $$\sum_\alpha (c_\alpha x)^2 / (2m_\alpha \omega_\alpha^2),$$

that accounts for the shift in bath coordinates as a result of coupling with the system. In this framework, the damping kernel and thermal fluctuations are given by:

$$\bar{\gamma}(t) = \frac{1}{m}\sum_\alpha \frac{c_\alpha^2}{m_\alpha \omega_\alpha^2}e^{-j\omega_\alpha t} \quad (3.1)$$

$$\bar{\xi}(t) = -\sum_\alpha c_\alpha \left(q_{\alpha_o} + j\frac{p_{\alpha_o}}{m_\alpha \omega_\alpha}\right)e^{-j\omega_\alpha t} \quad (3.2)$$

with $q_{\alpha_o}$ and $p_{\alpha_o}$ being the randomly selected initial values of the position and momentum coordinates of vibrational mode $\alpha$. Under the assumption that these values are sampled from an equilibrium Boltzmann distribution, the fluctuation dissipation relationship can be shown to hold $\langle \bar{\xi}(t)\bar{\xi}(0)\rangle = mk_B T \text{ Re}\bar{\gamma}(t)$, where $\text{Re}\bar{\gamma}(t)$ is the real part of the kernel. The equivalent bath temperature as seen by the system is given by $\langle \bar{\xi}(t)\bar{\xi}(0)\rangle/m$ Re $\bar{\gamma}(t)$. In the Markovian limit, when the environment-system interaction is without memory, by $\bar{\gamma}(t)=2\eta\delta(t)$. The real part of the parameter $\eta$ would represent an effective viscosity in a mechanical system, or could be interpreted as a linear resistance in an oscillatory electrical circuit, such as the one shown in FIG. 4B.

Figure 4A:
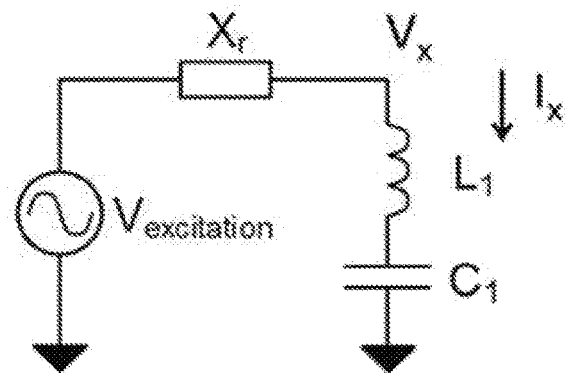
FIG. 4A illustrates a circuit model of an oscillator in contact with a thermodynamic bath.

FIG. 4A illustrates a circuit model of an oscillator in contact with a thermodynamic bath, with a classical excitation source applying a signal to the oscillator system via a dissipative contact, according to various example embodiments described herein. Before further describing the drawings, it is noted that FIGS. 4A, 4B, 5, 6A, and 6B are provided to illustrate the concept of feedback and the attenuation of dissipation and noise according to the embodiments described herein. The application of this feedback to the elementary system illustrated in these figures is also representative and provided to explain the concepts of the invention, which includes feedback applied to various mesoscale (and potentially other) charge transfer systems.

The system in question, whether quantum or classical, is stimulated by the randomized environment-induced thermal disturbances, which are balanced by the dissipative forces as it moves in the field described by the potential. According to the embodiments, an electronic feedback-based mechanism is proposed for the bandwidth-limited control of these thermal disturbances and the related damping forces. The case of electrical oscillators is considered here for demonstration purposes, but the proposed mechanism can be extended to mechanical systems as well.

Figure 4B:
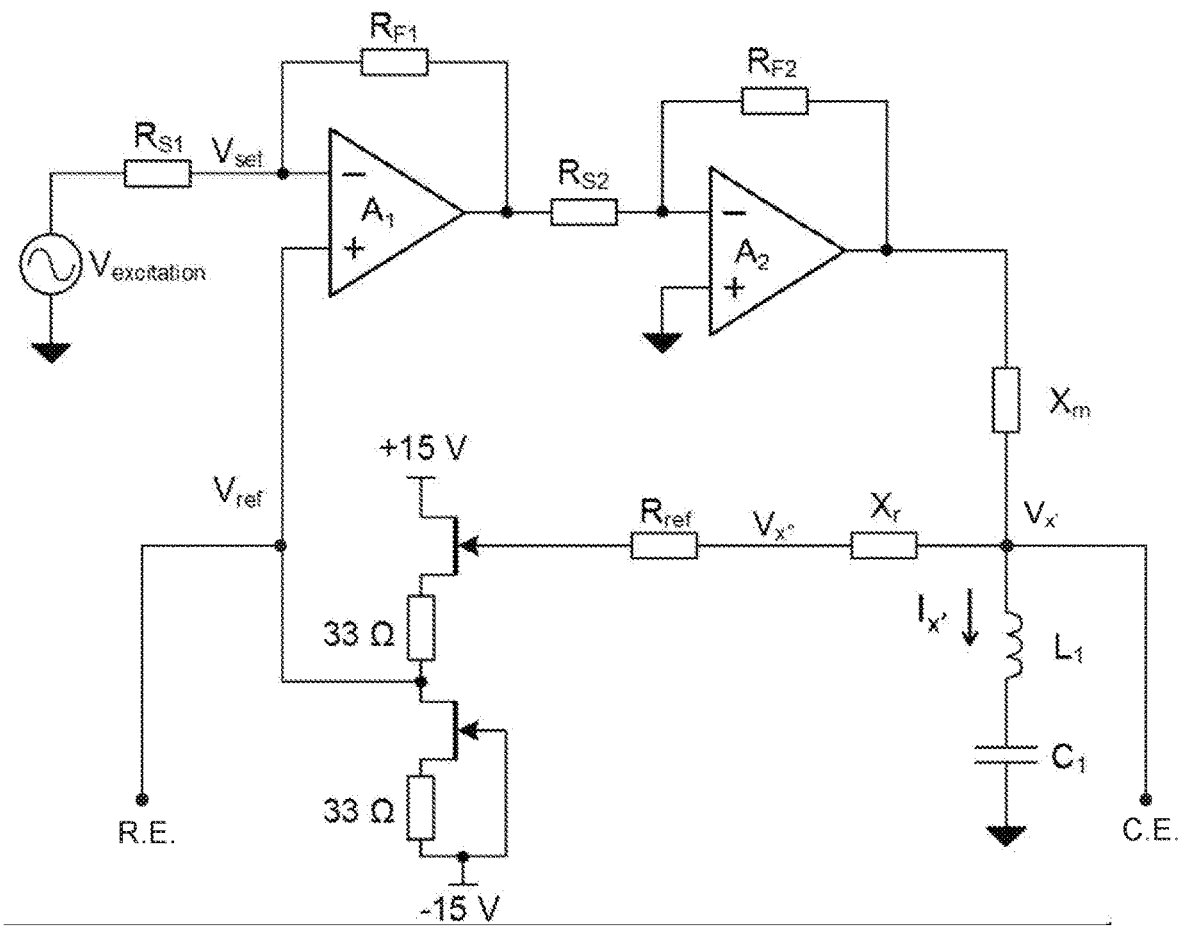
FIG. 4B illustrates a three terminal feedback system for the application of the signal to the oscillatory system shown in FIG. 4A.

As described herein, a scheme is presented whereby the system is decoupled from the physical reservoir with which it is in contact and coupled to another bath of pre-specified spectral density, ensuring control over the bath's effective 'temperature' and the damping experienced by the system. In that context, FIG. 4B illustrates a three terminal working electrode (W.E.), reference electrode (R.E.), and counter electrode (C.E.) feedback system for the application of the same signal as shown in FIG. 4A to the oscillatory system, where gain in the feedback loop attenuates the dissipative coupling to the environment. The feedback system shown in FIG. 4B can be relied upon to provide feedback to the three-electrode analog measurement topology circuit 1300 shown in FIG. 13 of U.S. Patent Publication No. 2014/0043049, for example, which also illustrates W.E., R.E., and C.E. electrodes. The entire contents of U.S. Patent Publication No. 2014/0043049 are hereby incorporated herein in their entirety.

As shown in the example of FIG. 4B, a sequence of cascaded amplifiers A1 and A2 is configured to deliver a high gain, corrective signal proportional to the difference between $V_{set}$ and $V_{ref}$ upon measurement of the reference voltage $V_{ref}$. The measurement is performed with a buffer amplifier A1 that has a high impedance input to minimize leakage currents in the measurement. The physical reference electrode (R.E.) for probing the reservoir voltage, $V_{ref}$, is deemed ideally to have zero source impedance, as is the physical counter electrode (C.E.) that applies the corrective signal $V_{x'}$ to the system. The circuit schematics in FIGS. 4A and 4B measure the currents $I_x$ and $I_{x'}$, respectively, flowing through the system across dissipative elements $X_r$ and $X_m$, respectively, in response to the classical voltage excitation bias applied at the reference electrode.

The respective transimpedance responses for the systems in FIGS. 4A and 4B are:

$$I_x = \frac{V_{set}}{X_r - jY_s} \text{ and} \quad (4.1)$$

$$I_{x'} = \frac{A_1 A_2 V_{set}}{X_m - jY_s + A_2(1 + A_1) \cdot (-jY_s)}, \quad (4.2)$$

where $Y_s$ is the resonant component of the system, given by $Y_s = (1/\omega C_1 - \omega L_1)$. $A_1, A_2$ are the gain functions of the respective amplifiers; the dissipative elements, $X_r$ and $X_m$ in (4.1, 4.2), have real and imaginary components obtained by averaging over the ensemble of vibrational modes:

$$X_r(\omega) = -j \cdot \left[ PP \int d\Omega g(\Omega) \frac{c^2(\Omega)}{m\Omega^2} \frac{1}{\omega^2 - \Omega^2} \right] + 2\pi \frac{g(\omega)c^2(\omega)}{m\omega^2} \quad (4.3)$$

where the first term, which includes the principle part (symbol PP) of the integral over the complex plane, is representative of a resonant frequency shift and the real term is the dissipation experienced by the oscillating system.

Figure 5:
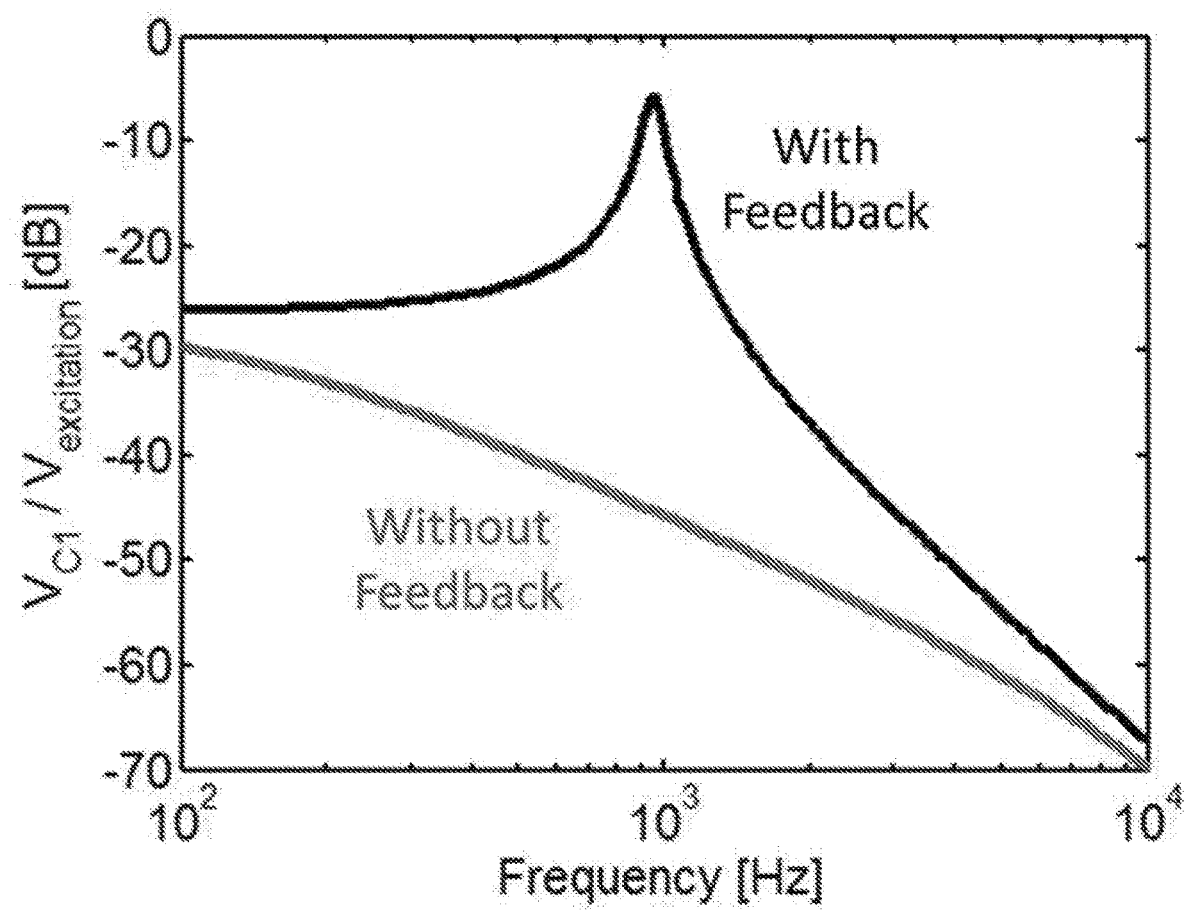
FIG. 5 illustrates a simulation graph for the oscillation amplitude measured at C1 in FIG. 4B in response to a small signal AC excitation with and without feedback.

Thus, the response of the oscillatory system to thermal excitations is dictated by the ensemble-averaged lumped circuit representation of the environment-induced dissipation as well as by the ensemble-averaged 'dressing' down of the resonant frequency of the system, also by the environment vibrational modes. In that context, FIG. 5 illustrates a simulation graph of the oscillation amplitude measured at C1 in FIG. 4B, for example, in response to a small signal AC excitation of about 0.4V, with and without feedback. For the LTSpice IV simulation, amplifiers were selected from its component library, and the following component values were set: L1=0.198H, C1=142 nF, $X_r$=9878 ohm, and $X_s$=100 kohm. Select values of the components were chosen as a representative example of how feedback attenuates the dissipative interaction between the oscillatory system and its thermal environment.

As shown in FIG. 5, the application of high gain negative feedback cancels the dissipation and the dressing down of the resonance as observed. The thermal disturbances induced by the reservoir on the system are measured at the R. E. node. These disturbances can be estimated and referred to the input source $V_{excitation}$ for the schematics in FIGS. 4A and 4B, as is standard practice in noise analysis in electronic circuits.

$$\langle V_x^2 \rangle = \frac{|Y_s|^2}{|X_r - jY_s|^2} \langle V_{X_r}^2 \rangle \quad (5.1)$$

$$\langle V_{x'}^2 \rangle = \frac{|A_1 A_2|^2 |Y_s|^2}{|X_m - jY_s + A_2(1 + A_1)(-jY_s)|^2} \langle V_{ref}^2 \rangle \quad (5.2)$$

The input-referred noise at the reference node is obtained by superposing each voltage noise source in the feedback loop and referring them to the input:

$$\langle V_{ref}^2 \rangle = \left( \frac{\langle V_{A_1}^2 \rangle}{\Delta f_{A_1}} + \frac{\langle V_{B_1}^2 \rangle}{\Delta f_{B_1}} \right) \Delta f_{ref} \left| \frac{A_1 A_2}{1 + A_1 A_2} \right|^2 + \\ \left( \frac{\langle V_{A_2}^2 \rangle}{\Delta f_{A_2}} + \frac{\langle V_{X_r}^2 \rangle}{\Delta f_{X_r}} + \frac{\langle V_{X_m}^2 \rangle}{\Delta f_{X_m}} \right) \Delta f_{ref} \frac{1}{|1 + A_1 A_2|^2} \quad (5.3)$$

and $\Delta f_i$ is the bandwidth of the i-th voltage noise source. For large $X_m$ and $A_1$, small reference node bandwidth $\Delta f^{ref}$ and a sufficiently quiet feedback network, the system would experience significantly smaller thermal disturbances, or a lower equivalent bath temperature, than in the case without feedback. The equivalent mode temperature for the oscillatory system, when in equilibrium with the reservoir modes, is estimated from the equipartition theorem as $T_s=(1/2\pi C_s k_B)\cdot\int\langle q_s^2\rangle d\omega$, where $$\langle q_s^2\rangle = \frac{1/L_s^2}{\frac{X_m^2\omega^2}{L_s^2|A_1A_2|^2}+(\omega_s^2-\omega^2)^2}\frac{\langle V_{ref}^2\rangle}{\Delta f_{ref}}, \quad (5.4)$$

assuming $|A_1A_2|\gg 1$ and is independent of frequency, and for which $\omega_s^2=1/L_sC_s$. Integrating over the frequency domain yields:

$$T_s \sim T\cdot\left(1+\frac{X_r}{X_m}\right)\frac{|A_1A_2|}{|1+A_1A_2|^2}+\left(\frac{\langle V_{A_2}^2\rangle}{\Delta f_{A_2}X_mk_B}\right)\frac{|A_1A_2|}{|1+A_1A_2|^2}+ \quad (5.5)$$
$$\left(\frac{\langle V_{A_1}^2\rangle}{\Delta f_{A_1}}+\frac{\langle V_{B_1}^2\rangle}{\Delta f_{B_1}}\right)\frac{|A_1A_2|}{X_mk_B}\left|\frac{A_1A_2}{1+A_1A_2}\right|^2.$$

In effect, the physical environment around the system is exchanged with the bath of modes associated with the measurement and feedback instrumentation, which can be tailored for a lower equivalent bath temperature by choosing components with minimal thermal noise characteristics. This method of electronic 'cooling' can be contrasted with other active feedback-based methodologies in opto-mechanical systems that utilize a large gain to increase the dissipative coupling between the mechanical system and its single mode optical environment, pre-prepared in a low temperature state, for improved cooling efficiency.

Figure 6A:
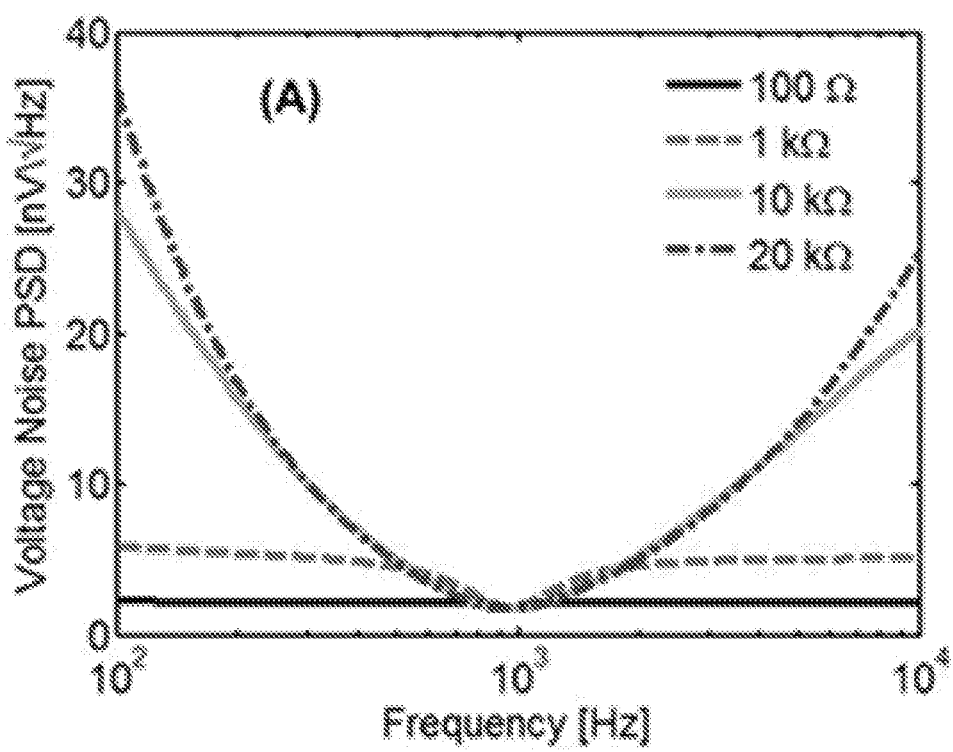
FIG. 6A illustrates a simulation of voltage noise spectral density for the oscillator node $V_x$ in FIG. 4A without feedback as a function of $X_r$.
Figure 6B:
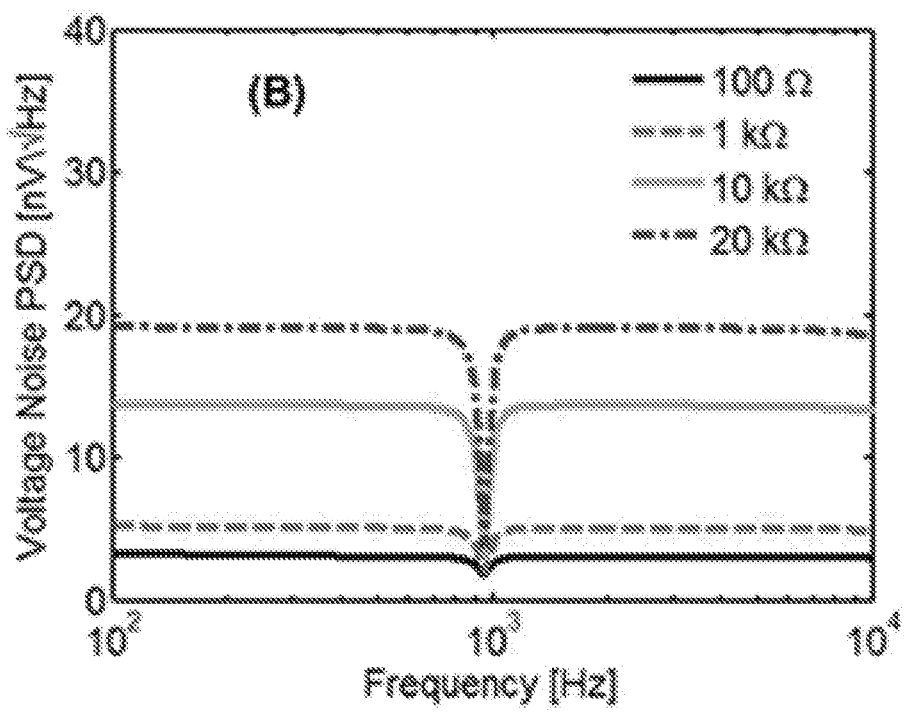
FIG. 6B illustrates a simulation of voltage noise spectral density for the oscillator node $V_{x'}$ in FIG. 4B with feedback as a function of $X_r$.
Figure 6C:
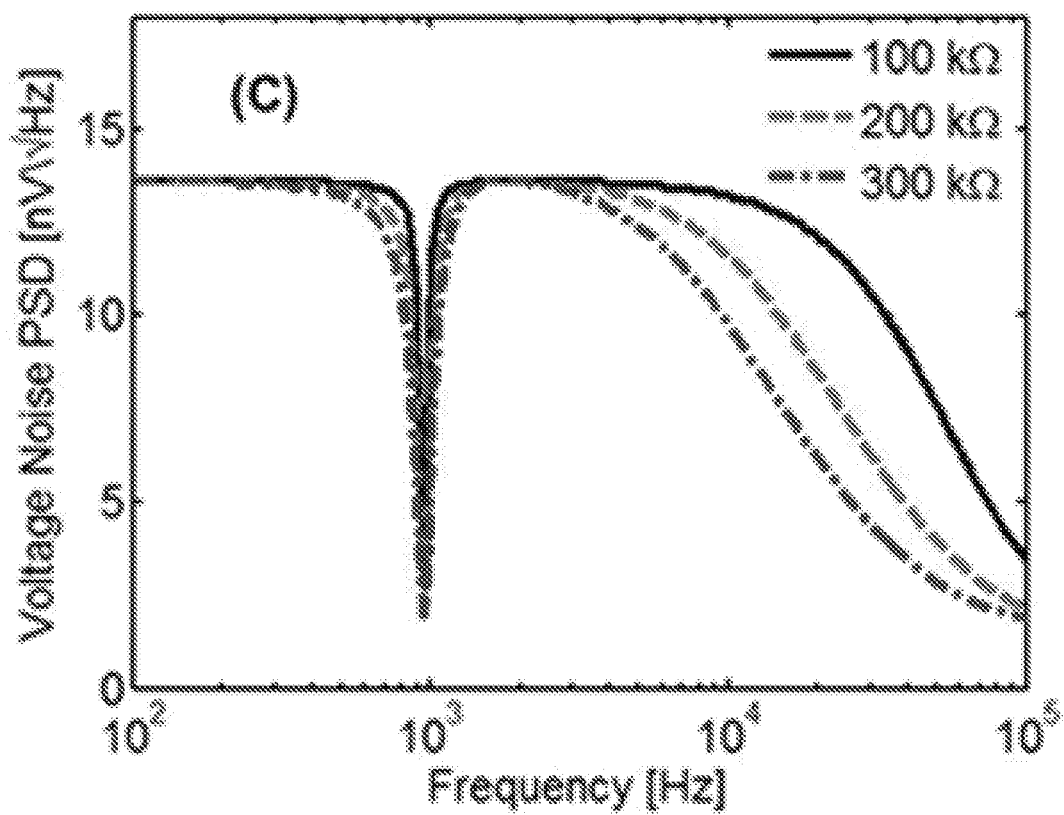
FIG. 6C illustrates a simulation of voltage noise spectral density for the oscillator node $V_{x'}$ in FIG. 4B with feedback as a function of $X_m$.

Simulations of voltage noise spectral density for the oscillator nodes $V_x$ in FIG. 4B and $V_{x'}$ in FIG. 4B, $\langle V_x^2\rangle/\Delta f$ and $\langle V_{x'}^2\rangle/\Delta f$, as functions of $X_r$ are depicted in FIGS. 6A and 6B, respectively. The series LC construct representing the oscillator system creates a high Q bandpass filter as a result of dissipation attenuation by the feedback. As the simulations indicate, feedback 'cools' the system, with the largest damping kernel being cooled the most. Further, FIG. 6C illustrates a simulation of voltage noise spectral density for the oscillator node $V_{x'}$ in FIG. 6B with feedback as a function of $X_m$. A larger $X_m$ results in a lower total voltage noise power, yielding a lower effective bath temperature. Also evident in FIG. 6C is the reduction in total integrated noise power, and the equivalent system mode temperature, with increasing $X_m$.

The effect of feedback on mesoscale charge transfer systems is now described in detail, by referencing the simpler example developed above of a single oscillator in contact with a thermal environment. The quantum dynamics of Hermitian Hamiltonians are known to correspond to the coupled motion of classical mechanical or electrical oscillators. Specifically, the classical probability amplitudes describing the time-dependent state of an oscillatory system are equivalent to the quantum amplitudes that characterize the evolution of the wavefunction of an excited quantum system by a time-dependent Schrodinger's wave equation. Consider single energy level donor and acceptor states, immersed in a reservoir bath, and coupled to one another so as to excite an electronic transition from the electronic source to the sink, as follows:

$$H = H_d + H_a + H_{env} + H_{d-a} + H_{d-env} + H_{a-env} \quad (6.1)$$
$$= \frac{\bar{p}_1^2}{2M_1}+\frac{M_1\omega_1^2\bar{Q}_1^2}{2}+\frac{\bar{p}_2^2}{2M_2}+\frac{M_2\omega_2^2\bar{Q}_2^2}{2}+$$
$$\sum_\alpha \frac{\bar{p}_\alpha^2}{2m_\alpha}+\frac{m_\alpha\omega_\alpha^2\bar{q}_\alpha^2}{2}+V_{12}\bar{Q}_1\bar{Q}_2+$$
$$\sum_\alpha (V_{1\alpha}\bar{Q}_1+V_{2\alpha}\bar{Q}_2)\bar{q}_\alpha$$

The 'momentum' and 'position' coordinates for the system and environment can be suitably non-dimensionalized as follows:

$$Q_j = \left(\frac{M_j\omega_j}{\hbar}\right)^{1/2}\bar{Q}_j;\ p_j = \left(\frac{1}{M_j\omega_j\hbar}\right)^{1/2}\bar{p}_j\ j=1,2, \quad (6.2)$$

$$q_\alpha = \left(\frac{m_\alpha\omega_\alpha}{\hbar}\right)^{1/2}\bar{q}_\alpha;\ p_\alpha = \left(\frac{1}{m_\alpha\omega_\alpha\hbar}\right)^{1/2}\bar{p}_\alpha,\ \text{and} \quad (6.3)$$

$$v_{12} = \frac{V_{12}}{(M_1M_2\omega_1\omega_2)^{1/2}};\ v_{j\alpha} = \frac{V_{j\alpha}}{(M_jm_\alpha\omega_j\omega_\alpha)^{1/2}}\ j=1,2. \quad (6.4)$$

The dynamics of the system and environment can be re-derived from the modified non-dimensionalized Hamiltonian:

$$\dot{Q}_1(t) = \omega_1 p_1;\ \dot{p}_1(t) = -\omega_1 Q_1 + v_{12}Q_2 + \sum_\alpha v_{1\alpha}q_\alpha, \quad (6.5)$$

$$\dot{Q}_2(t) = \omega_2 p_2;\ \dot{p}_2(t) = -\omega_2 Q_2 + v_{12}Q_1 + \sum_\alpha v_{2\alpha}q_\alpha,\ \text{and} \quad (6.6)$$

$$\dot{q}_\alpha(t) = \omega_\alpha p_\alpha;\ \dot{p}_\alpha(t) = -\omega_\alpha q_\alpha + v_{1\alpha}Q_1 + v_{2\alpha}Q_2. \quad (6.7)$$

Figure 7A:
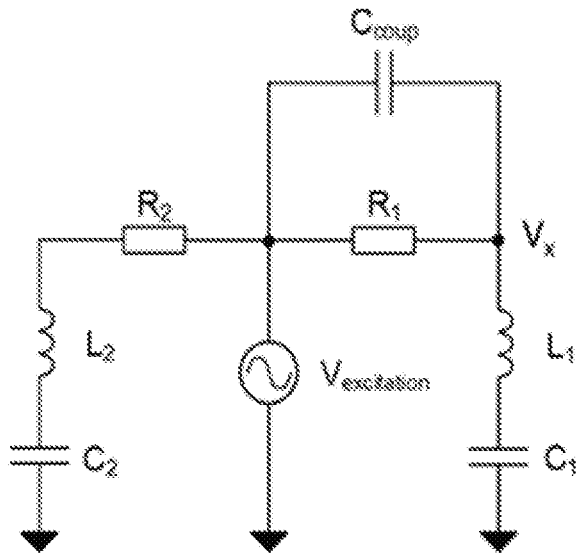
FIG. 7A illustrates a circuit model for a two-state electronic excitation transfer (EET) system coupled to an external bath of reservoir modes according to various example embodiments described herein.

Based on the dynamical equations of motion 6.5-6.7, an equivalent circuit description of the inter-coupled, single electronic energy level, donor and acceptor charge transfer system is proposed as shown in FIG. 7A. Particularly, FIG. 7A illustrates a circuit model for a two-state electron energy transfer (EET) system coupled to an external bath of reservoir modes according to various example embodiments described herein. The individual energy levels are modeled as resonant elements that are coupled to the physical environment or, in the case of feedback, to the bath reservoir of instrumentation modes dissipatively via resistors at the reference node. The reference node in FIG. 7A defines the location where an external bias is applied, or where, in the feedback case, a reference probe is inserted to measure the 'energy' of one of the levels that the feedback loop constrains to a desired setpoint. In this context, the reference is deemed a proxy measure for the second energy level in experimental systems where direct access to the state energy is unavailable. In addition, a capacitor between a resonant unit and the reference probe models the non-dissipative coupling between the energy levels. The 'ground' for the proposed circuit model in FIG. 7A defines the energy ground state relative to which the energy of the resonant elements ($\omega_1$, $\omega_2$) and the source excitation signal (eV/$\hbar$) are measured.

Recasting the equations of motion in terms of the probability amplitude for donor/acceptor states, $Z_{1,2}=Q_{1,2}+jp_{1,2}$, as well as for the environment modes, $Z_\alpha=q_\alpha+jp_\alpha$, $$\dot{Z}_1 + j\omega_1 Z_1 = jv_{12}Z_2 - \sum_\alpha v_{1\alpha}^2 \int_0^t dt' Z_1(t') e^{-j\omega_\alpha(t-t')} - \quad (6.8)$$

$$\sum_\alpha v_{1\alpha}v_{2\alpha}\int_0^t d\tau Z_2(\tau)e^{-j\omega_\alpha(t-\tau)} + j\sum_\alpha v_{1\alpha}Z_{\alpha 0}e^{-j\omega_\alpha t},$$

and $$\dot{Z}_2 + j\omega_2 Z_2 = jv_{12}Z_1 - \sum_\alpha v_{2\alpha}^2 \int_0^t dt' Z_2(t') e^{-j\omega_\alpha(t-t')} - \quad (6.9)$$

$$\sum_\alpha v_{2\alpha}v_{1\alpha}\int_0^t d\tau Z_1(\tau)e^{-j\omega_\alpha(t-\tau)} + j\sum_\alpha v_{2\alpha}Z_{\alpha 0}e^{-j\omega_\alpha t},$$

after integrating out the environment mode dynamics. The state occupation probabilities may be estimated from $$P_i = \frac{|Z_i|^2}{\sum_i |Z_i|^2}.$$

$Z_{\alpha 0}$ is the randomly chosen initial value for the occupation probability of mode $\alpha$. The form of the dynamical equations 6.8 and 6.9 constitute Hermitian generalizations of the Hamiltonian in equation 6.1 with linear position and momentum off-diagonal coupling, which is also referred to as a system of p&q coupled oscillators. Equations 6.8, 6.9 can be transformed by a redefinition of the variables $Z_{1,2}e^{j\omega_{1,2}t} = \tilde{Z}_{1,2}$ and the first integral term on the R.H.S of equation 6.8 can be simplified as:

$$-\sum_\alpha v_{1\alpha}^2 \int_0^t dt' Z_1(t') e^{-j\omega_\alpha(t-t')} = -\tilde{Z}_1(t)\int_0^\infty d\tau' \sum_\alpha v_{1\alpha}^2 e^{-j(\omega_\alpha-\omega_1)\tau'} \quad (6.10)$$

$$= -\tilde{Z}_1(t)\left[j\Delta\omega_{11} + \frac{1}{2}\gamma_{11}\right],$$

where $$\Delta\omega_{11} = PP\int d\omega g(\omega)\frac{v_1^2(\omega)}{\omega_1 - \omega}$$

and $\gamma_{11}=2\pi v_1(\omega_1)g(\omega_1)$ constitute an effective resonance shift and damping kernel respectively. The last terms on the R.H.S. of equations 6.8 and 6.9 constitute the noise source terms that thermally excite the transfer events. Similar simplifications can be introduced for the other integral terms, resulting in equations 6.8 and 6.9 being rewritten as:

$$\dot{Z}_1 = -\left(j\omega_1 + j\Delta\omega_{11} + \frac{1}{2}\gamma_{11}\right)Z_1 + \quad (6.11)$$

$$\left(jv_{12} - j\Delta\omega_{12} - \frac{1}{2}\gamma_{12}\right)Z_2 + j\sum_\alpha v_{1\alpha}Z_{\alpha 0}e^{-j\omega_\alpha t},$$

and $$\dot{Z}_2 = -\left(j\omega_2 + j\Delta\omega_{22} + \frac{1}{2}\gamma_{22}\right)Z_2 + \quad (6.12)$$

$$\left(jv_{12} - j\Delta\omega_{21} - \frac{1}{2}\gamma_{21}\right)Z_1 + j\sum_\alpha v_{2\alpha}Z_{\alpha 0}e^{-j\omega_\alpha t},$$

with the parameters $$\Delta\omega_{ij} = PP\int d\omega g(\omega)\frac{v_i(\omega)v_j(\omega)}{\omega_j - \omega}$$

and $\gamma_{ij}=2\pi v_i(\omega_j)v_j(\omega_j)g(\omega_j)$.

Specific cases for large and small inter-level coupling ($v_{12}$) are considered as asymptotic limits of the proposed 'classical' charge transfer model. The model is simplified by the assumption that bath modes for the two charge transfer component systems are identical, i.e. $v_{1\alpha}=v_{2\alpha}=v_\alpha$ for all $\alpha$, without any loss in generality. For the case when $v_{12} \gg$ max $$\left(|\omega_1-\omega_2|, \left|\int_0^\infty d\tau \sum_\alpha v_\alpha^2 e^{-j\omega_\alpha \tau}\right|\right),$$

the eigenvalues of the system 6.11 and 6.12 are:

$$\Omega_1 = \frac{\omega_1 + \omega_2}{2} - v_{12} + (\Delta\omega_{11} + \Delta\omega_{22}) - j\frac{(\gamma_{11} + \gamma_{22})}{2} \quad (6.13a)$$

and $$\Omega_2 = \frac{\omega_1 + \omega_2}{2} + v_{12}. \quad (6.13b)$$

In the limit that $\Delta\omega_{ii}, \gamma_{ii} \to 0$ for i=1, 2, the results in equations 6.13a and 6.13b indicate the creation of new energy surfaces engendered by a split of magnitude $2v_{12}$ in the strongly coupled h.o. wells of energy $\omega_1$ and $\omega_2$. The occupation probabilities for these new energy surfaces, as functions of time, are given by:

$$P(\omega=\Omega_1, t:\Delta\omega_{ii}, \gamma_{ii}\to 0)=1 \text{ and} \quad (6.13c)$$

$$P(\omega=\Omega_2, t:\Delta\omega_{ii}, \gamma_{ii}\to 0)=0, \quad (6.13d)$$

for the case when the initial condition requires that the system in populated in state $\omega_1$. These results are indicative of an adiabatic transfer process, characterized by a confinement of the electronic charge to an adiabatic energy surface through the process of transfer from the donor to the acceptor. On the other hand, when $v_{12} \to 0$, the eigenvalues are given by:

$$\Omega_1 = \omega_1 + \Delta\omega_{11} - j\frac{\gamma_{11}}{2} \quad (6.14a)$$

and $$\Omega_2 = \omega_2 + \Delta\omega_{22} - j\frac{\gamma_{22}}{2}, \quad (6.14b)$$

which is indicative of a diabatic crossing of the weakly coupled h.o. wells, also for the limit of zero dissipation. The corresponding probability that the system makes a quantum jump from energy surface $\omega_1$ to surface $\omega_2$ at the crossing of the diabatic curves is given by:

$$P(\omega=\Omega_2, t:\Delta\omega_{ii}, \gamma_{ii} \to 0) = v_{12}^2 \frac{\sin^2\left(\frac{(\omega_1-\omega_2)}{2}\right)t}{\left(\frac{\omega_2-\omega_1}{2}\right)^2} \quad (6.14c)$$

and $$P(\omega = \Omega_1, t:\Delta\omega_{ii}, \gamma_{ii} \to 0) = 1 - P(\omega = \Omega_2, t:\Delta\omega_{ii}, \gamma_{ii} \to 0) \quad (6.14d)$$

in the limit of vanishingly small $v_{12}$ and by ignoring the effects of the environment on the transition process. The transition probability as derived from equation 6.14c obeys Fermi's golden rule. The results in equations 6.13 and 6.14 confirm the applicability of the classical model in describing charge transfer in the asymptotic limits of adiabatic and diabatic transfer. The inclusion of the effects of the reservoir bath in the estimation of the eigenfrequencies and of the transition rate for the diabatic case indicates that the excitation due to the coupling between donor and acceptor states can be dissipated through the many mechanisms for energy-exchange that exist between the charge transfer system and the external reservoir. Specifically, the interference term in equation 6.14c is now modified as:

$$P(\omega = \Omega_2, t) \sim \frac{v_{12}^2}{(\omega_2 + \Delta\omega_{22} - \omega_1 - \Delta\omega_{11})^2 + \frac{\gamma_{11}^2 + \gamma_{22}^2}{4}}(e^{-\gamma_{11}t} + \quad (6.14e)$$

$$e^{-\gamma_{22}t} + 2e^{-\gamma_{11}t/2-\gamma_{22}t/2}\cos(\omega_2 + \Delta\omega_{22} - \omega_1 - \Delta\omega_{11})) +$$

$$\frac{v_{12}^2}{(\omega_2 + \Delta\omega_{22} - \omega_1 - \Delta\omega_{11})^2 + \frac{\gamma_{11}^2 + \gamma_{22}^2}{4}}$$

$$\left[\sum_\alpha v_\alpha^2 |Z_{\alpha 0}|^2 \left(\begin{array}{c} \frac{e^{-\gamma_{11}t}}{(\omega_\alpha - \omega_1 - \Delta\omega_{11})^2 + \frac{\gamma_{11}^2}{4}} + \\ \frac{e^{-\gamma_{22}t}}{(\omega_2 + \Delta\omega_{22} - \omega_\alpha)^2 + \frac{\gamma_{22}^2}{4}} - \\ \frac{e^{-j(\omega_1 + \Delta\omega_{11})t - \gamma_{11}t/2 + j(\omega_2 + \Delta\omega_{22})t + \gamma_{22}t/2}}{(j(\omega_\alpha - \omega_1 - \Delta\omega_{11}) - \gamma_{11}/2)} - \\ (j(\omega_2 - \omega_\alpha)) \\ \frac{e^{+j(\omega_1 + \Delta\omega_{11})t + \gamma_{11}t/2 - j(\omega_2 + \Delta\omega_{22})t - \gamma_{22}t/2}}{(j(-\omega_\alpha + \omega_1 + \Delta\omega_{11}) + \gamma_{11}/2)} \\ (j(\omega_\alpha - \omega_2)) \end{array}\right)\right] +$$

$$\sum_\alpha \frac{v_\alpha^2 |Z_{\alpha 0}|^2}{(\omega_\alpha - \omega_2 - \Delta\omega_{22})^2 + \frac{\gamma_{22}^2}{4}}[1 + e^{-\gamma_{22}t} -$$

$$2e^{-\gamma_{22}t/2}\cos(\omega_2 + \Delta\omega_{22} - \omega_\alpha)t]$$

In addition to the damped interference between states seen as the first term on the R.H.S., the transition probability for the electron to make the jump from energy surface $\Omega_1$ to $\Omega_2$ is also determined by indirect paths through the environment by the inelastic exchange of energy between the individual states $\Omega_1$, $\Omega_2$ and the reservoir modes that are determined by the density of states of the environmental modes and their coupling strength to the charge transfer system, as seen in the second term on R.H.S. The third term denotes the scattering into and out of the state $\Omega_2$ due to the environment, independent of the transfer process.

The application of an electronic feedback mechanism to attenuate the damping induced by the physical reservoir could, (a) reduce the non-dissipative coupling between the two energy states, rendering the EET process diabatic, and/or (b) enable the preservation of the coherent interference phenomena between vibronic states of the two-level systems. A simultaneous reduction in the r.m.s voltage fluctuations between the participant energy states by a low voltage-noise feedback mechanism would also help suppress the background due to the inelastic processes.

Figure 7B:
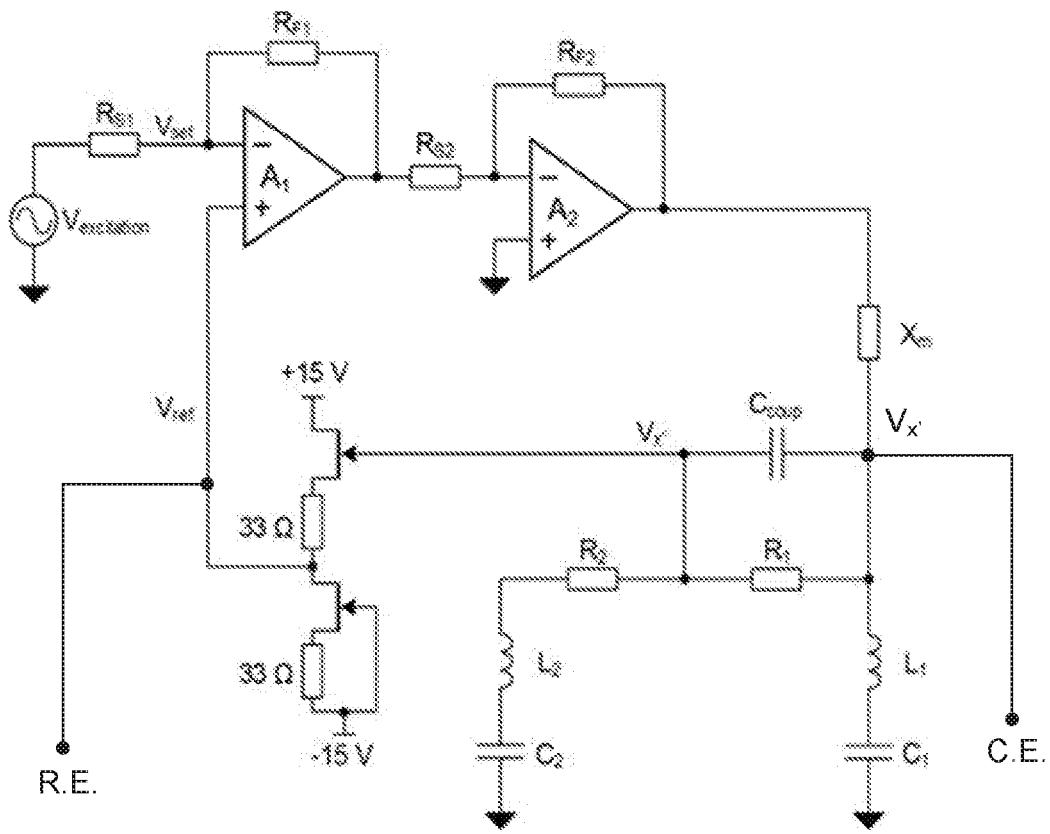
FIG. 7B illustrates a feedback system coupled to the EET system shown in FIG. 7A for the attenuation of environment-induced dissipation.

In the context of an electronic feedback mechanism, FIG. 7B illustrates a feedback system coupled to the two-state EET system shown in FIG. 7A for the attenuation of environment-induced dissipation according to various example embodiments described herein. FIGS. 7A and 7B are also provided as representative illustrations of the use of feedback for the attenuation of dissipation and noise according to the embodiments described herein. Among the embodiments, this type of feedback can be applied to various mesoscale charge transfer systems.

Here, the reference electrode or probe (R.E.) measures the energy of the quantum state 2, and the feedback sets the energy to a desired setpoint via a corrective signal applied to the energy of state 1. All state energies are measured relative to the system ground as mentioned previously. An ideal, dissipation-free reference probe is assumed in contact with the participant energy state 2 for the subsequent analysis with $\Delta\omega_{22}, \gamma_{22} \to 0$. The analysis may be extended to the more general case with dissipation in the reference channel. With the application of feedback, the probability amplitudes for the states of the two participatory species in the charge transfer process are given by:

$$Z_1(V, \omega) = \frac{\left(-jv_{12}\frac{j\Delta\omega_{11} + \gamma_{11}/2}{(jv_{12} + j\Delta\omega_{11} + \gamma_{11}/2)} + j\left(\frac{eV}{\hbar} - \omega_2\right)\right)\sum_\alpha v_\alpha Z_{\alpha 0}\delta\left(\frac{eV}{\hbar} - \omega_\alpha\right)}{\left(j\Delta\omega_{11} + \gamma_{11}/2 + j\left(\frac{eV}{\hbar} - \omega_1\right)\right)\left(-jv_{12}\frac{(j\Delta\omega_{11} + \gamma_{11}/2)}{(jv_{12} + j\Delta\omega_{11} + \gamma_{11}/2)} + j\left(\frac{eV}{\hbar} - \omega_2\right)\right)\frac{1}{A_1A_2(\omega)} + j\left(\frac{eV}{\hbar} - \omega_1\right) \cdot j\left(\frac{eV}{\hbar} - \omega_2\right)} \quad (7.1a)$$

and $$Z_2(V, \omega) = \frac{j\left(\frac{eV}{\hbar} - \omega_1\right)\sum_\alpha v_\alpha Z_{\alpha 0}\delta\left(\frac{eV}{\hbar} - \omega_\alpha\right)}{\left(j\Delta\omega_{11} + \gamma_{11}/2 + j\left(\frac{eV}{\hbar} - \omega_1\right)\right)\left(-jv_{12}\frac{(j\Delta\omega_{11} + \gamma_{11}/2)}{(jv_{12} + j\Delta\omega_{11} + \gamma_{11}/2)} + j\left(\frac{eV}{\hbar} - \omega_2\right)\right)\frac{1}{A_1A_2(\omega)} + j\left(\frac{eV}{\hbar} - \omega_1\right) \cdot j\left(\frac{eV}{\hbar} - \omega_2\right)} \quad (7.1b)$$

In these descriptors for the probability amplitudes, the excitation signal applied to the EET system via the feedback loop input, as shown in FIG. 7B, comprises two separable frequency components: a high frequency part that characterizes the energy difference between the two participant states (V) of the quantum mechanical charge transfer system and a low frequency signal that describes the time response of the electrical feedback mechanism ($\omega$). In the asymptotic limit of large gain, the dynamic equations, as derived from Equations 7.1a and 7.1b, governing the evolution of the probability amplitudes are given by:

$$\dot{Z}_1 = -j\omega_1 Z_1 - j(\omega_2 - \omega_1)\frac{jv_{12}(j\Delta\omega_{11} + \gamma_{11}/2)}{jv_{12} + j\Delta\omega_{11} + \gamma_{11}/2}Z_2; \quad (7.2a)$$

-continued $$Z_1(0) = v(\omega_1)g(\omega_1)Z_{10}$$

and $$\dot{Z}_2 = -j\omega_2 Z_2; Z_2(0) = v(\omega_2)g(\omega_2)Z_{20}, \quad (7.2b)$$

where the significantly slower dynamics of timescales $\sim\omega$ are considered static as the probability amplitudes rapidly evolve towards steady state. The eigenfrequencies for the charge transfer system, in the limit of large gain, and for the specific case of the dissipation-less reference probe are given by:

$$\Omega_1(\Delta\omega_{22},\gamma_{22}\to 0)=\omega 1 \text{ and} \quad (7.3a)$$

$$\Omega_2(\Delta\omega_{22},\gamma_{22}\to 0)=\omega_2, \quad (7.3b)$$

which are independent of the non-dissipative coupling $v_{12}$ between the participant species. The feedback decouples the interacting energy states from one another and constrains the EET process to be diabatic in nature. Therefore, a linear sweep of the voltage at the reference node, where $\omega_2=\omega_2^\circ-eV/\hbar$, is analogous to a scan of the energy of state 2. The r.m.s. voltage noise determines the spread around the frequency $\omega_2$, and a low-noise voltage excitation signal mitigates this spread, which is analogous to the effect of a cryostatic reduction in bath temperature.

The participating species in the transfer process are indistinguishable from the environment at $t=0$ and the probability amplitudes of environment modes of frequencies $\omega_1$ and $\omega_2$ are $Z_{10}$ and $Z_{20}$, respectively. The environment modes are assumed to evolve along a deterministic trajectory determined by the dynamics of the classical excitation signal, V, acting on the modes. As such, the amplitudes of environment modes at energies $\omega_1$ and $\omega_2$ are described by their respective coherent state amplitudes as:

$$Z_{10}(\omega) = \frac{1}{(e\Delta V/\hbar)^{1/2}\pi^{1/4}}\exp\left(-\frac{(\omega-\omega_1)^2}{2(e\Delta V/\hbar)^2}\right) \quad (7.4a)$$

and $$Z_{20}(\omega) = \frac{1}{(e\Delta V/\hbar)^{1/2}\pi^{1/4}}\exp\left(-\frac{(\omega-\omega_2)^2}{2(e\Delta V/\hbar)^2}\right). \quad (7.4b)$$

Here, $\Delta V$ is the thermal r.m.s. voltage fluctuation of the excitation signal, which is proportional to $\sqrt{T}$. The corresponding initial conditions in Equations 7.2a and 7.2b would be modified as:

$$Z_1(0) = \int_{-\infty}^{\infty} v(\omega)g(\omega)Z_{10}(\omega) \quad (7.5a)$$

and $$Z_2(0) = \int_{-\infty}^{\infty} v(\omega)g(\omega)Z_{20}(\omega). \quad (7.5b)$$

The spread about the environment mode frequencies $\omega_1$ and $\omega_2$, $e\Delta V/\hbar$, determines whether bath modes in the vicinity of the characteristic frequencies are able to contribute to the evolution of the wavefunctions for the sub-systems 1 and 2 that are participating in the EET process. Minimization of the r.m.s voltage noise at the reference node of the feedback loop or an equivalent reduction in bath temperature reduces the contribution from these background processes for states 1 and 2. Thus, environment-induced scattering into and out of the electronic states 1 and 2 are confined to bath modes that are resonant with the state energies $\omega_1$ and $\omega_2$.

The solution of the dynamical equations 7.2a and 7.2b yield the time evolution of probability amplitudes for states 1 and 2:

$$Z_1(t) = v(\omega_1)g(\omega_1)Z_{10}\left(1 - \frac{jv_{12}(j\Delta\omega_{11}+\gamma_{11}/2)}{(jv_{12}+j\Delta\omega_{11}+\gamma_{11}/2)}\right)e^{-j\omega_1 t} + \quad (7.6a)$$

$$v(\omega_2)g(\omega_2)Z_{20}\left(\frac{jv_{12}(j\Delta\omega_{11}+\gamma_{11}/2)}{(jv_{12}+j\Delta\omega_{11}+\gamma_{11}/2)}\right)e^{-j\omega_2 t} \text{ and}$$

$$Z_2(t) = v(\omega_2)g(\omega_2)Z_{20}e^{-j\omega_2 t}, \quad (7.6b)$$

for the ideal initial conditions of zero spread about the environment modes $\omega_1$ and $\omega_2$. The line width around the electronic state $\omega_1$ is also minimized by the attenuation of the dissipative coupling between state 1 and its environment modes which has been described previously. Therefore, the primary EET process is constrained to an exchange of energy between the electronic energy level of state 1 and the bath mode at frequency $\omega_2$, where each participant state energy level is characterized by a narrow spread.

The participant electronic states also exchange energy with bath modes that are resonant with the respective electronic energies. State 1, for which the feedback attenuates the dissipative coupling with the environment modes, is also characterized by persistent spectral coherence with the bath mode resonant with state 2 as seen in Equation 7.6a. The interference between the electronic and vibronic states, observed within the dynamic variables $Q_1$, $p_1$ that characterize an EET participant, enables measurement of the vibronic structure of the complementary participant that is subject to the energy scan. This measurement methodology is particularly useful where direct measurement of the dynamic variables of the complimentary participant in the EET process is not possible, for example in a molecular electrochemical charge transfer system, where state 2 characterizes a redox-active molecule dissolved in a liquid electrolyte medium.

In summary, a feedback mechanism is proposed that attenuates dissipation from a thermodynamic bath to preserve coherent interferences between participant states in an EET process. A classical circuit analogy is shown to characterize the effect of electronic feedback on the quantum EET system. In addition, the dissipation-free state can probe the vibronic characteristics of the complimentary participant state through the suppression of the r.m.s. voltage fluctuations between the two states using negative feedback.

EXAMPLE

A potentiostatic apparatus with a feedback control system detects Staphylococcal Enterotoxin B in an electrolyte containing redox couple potassium hexacyanoferrate (ii)/(iii). The concentration of the analyte in the electrolyte ranges from 1 μg/ml to 1 μg/ml. The potentiostatic apparatus includes a counter electrode, a reference electrode and a working electrode that are in electrical contact with the electrolyte. The counter, reference and working electrodes are made of metals (e.g., gold, platinum, platinum-iridium, silver, silver/silver-chloride). The potentiostatic apparatus detects the potential of the redox active species in the electrolyte at the reference electrode, and based on the detected potential, provides a low-noise high gain feedback current signal to the electrolyte via the counter electrode. The charge in the current signal is carried between the counter electrode and the working electrode by mono and di-hydrogen phosphate anions and potassium cations. The working electrode is grounded (i.e., connected to a ground potential), and the charge received by the working electrode is transferred to the ground.

The reference electrode is electrically coupled to a voltage buffer via an impedance. The voltage buffer includes an nMOS transistor cascaded with another nMOS transistor. The drain of the first nMOS transistor is electrically connected to a voltage source with potential $+V_B$, and the gate of the first nMOS transistor is electrically coupled to the reference electrode via an impedance $X_{ref}$. The drain of the second nMOS transistor is electrically connected to the source of an nMOS transistor via impedance $R_{B1}$. The source of the second nMOS transistor is electrically connected to a voltage source with potential $-V_B$ via impedance $R_{B2}$. Additionally, the gate of the nMOS transistor electrically connected to a voltage source with potential $-V_B$. The potential at the drain of the second nMOS transistor is the output $V_{meas}$ of the voltage buffer.

A pair of cascaded high gain amplifiers can deliver a high gain corrective signal to the electrolyte via the counter electrode. The first high gain amplifier receives a set potential $V_{set}$ (at inverting input terminal), and the output of the voltage buffer $V_{meas}$ (at non inverting input terminal) as inputs. The output of the first gain amplifier is connected to the inverting input terminal of the first high gain amplifier by a resistor $R_{F1}$. The output of the first high gain amplifier is electrically connected to the inverting input terminal of the second high gain amplifier via resistor $R_{S2}$. The non-inverting input terminal of the second amplifier is connected to a ground potential. The output of the second high gain amplifier is connected to the inverting input terminal of the second high gain amplifier by a resistor $R_{F2}$. The output of the second high gain amplifier (corrective feedback current signal) is electrically connected to the counter electrode via resistor $X_M$.

The corrective feedback current signal is detected by measuring the voltage across the resistor $X_M$ using a low noise voltmeter or a transimpedance amplifier. The corrective feedback current signal determines the potential of the counter electrode and suppresses dissipation acting on the charge transfer process, as well as the thermal voltage fluctuations acting on the species in the electrolyte. The corrective feedback signal can, thus, affect the electronic exchange process at the working electrode. The corrective feedback signal can change when the set potential $V_{set}$ is changed. The voltmeter detects the change in the corrective feedback current for different values of the set potential $V_{set}$. The voltmeter is connected to a controller (e.g., general purpose computer) that changes the value for the set potential $V_{set}$ and records the corresponding corrective feedback current. As a result, the controller generates current versus voltage data for the electrolyte with the analyte. An analytics routine then compares the signatures in the acquired I-V trace with those in a reference database to ascertain the identity of the analyte.

What is claimed is:

1. A system comprising:
   (a) a plurality of electrodes configured to electrically couple to an electrochemical system; and
   (b) a feedback mechanism coupled to a first electrode of the plurality of electrodes and configured to detect a potential associated with the electrochemical system via the first electrode, wherein the feedback mechanism provides a feedback signal to the electrochemical system via a second electrode of the plurality of electrodes, the feedback signal configured to provide excitation control of the electrochemical system at a third electrode of the plurality of electrodes,
   wherein the feedback mechanism comprises a first negative-feedback amplifier configured to generate a first signal based on a difference between the detected potential and a set potential value.

2. The system of claim 1, wherein the feedback signal provides excitation control of an electrolyte in the electrochemical system during electronic excitation transfer (EET) in the electrochemical system.

3. The system of claim 2, wherein the excitation control attenuates thermal disturbances in electric field in proximity to the third electrode due to electronic noise injected into the electrochemical system from the first electrode and the second electrode.

4. The system of claim 2, wherein the excitation control reduces dissipation in the charge transfer between one or more vibronic energy levels of redox species and the third electrode.

5. The system of claim 1, wherein the first, second, and third electrodes are a reference electrode, a counter electrode, and a working electrode of a potentiostat, respectively.

6. The system of claim 1, wherein the feedback mechanism comprises a second negative feedback amplifier configured to receive the first signal and generate the feedback signal.

7. The system of claim 1, comprising a current detection system configured to detect a current associated with the second electrode.

8. The system of claim 7, wherein the current associated with the second electrode is indicative of an analyte in the electrochemical system.

9. The method of claim 1, wherein the feedback mechanism comprises a second negative feedback amplifier configured to receive the first signal and generate the feedback signal.

10. A method of analyte detection comprising:
    (a) detecting, by a feedback mechanism via a first electrode of a plurality of electrodes, a potential associated with an electrochemical system, wherein the plurality of electrodes are electrically coupled to the electrochemical system;
    (b) generating, by the feedback mechanism, a feedback signal; and
    (c) providing the feedback signal to the electrochemical system via a second electrode of the plurality of electrodes, the feedback signal configured to provide excitation control of the electrochemical system at a third electrode of the plurality of electrodes
    wherein the feedback mechanism comprises a first negative-feedback amplifier configured to generate a first signal based on a difference between the detected potential and a set potential value.

11. The method of claim 10, wherein the feedback signal provides excitation control of an electrolyte in the electrochemical during electronic excitation transfer (EET) in the electrochemical system.

12. The method of claim 11, wherein the excitation control attenuates thermal disturbances in electric field in proximity to the third electrode due to electronic noise injected into the electrochemical system from the first electrode and the second electrode.

13. The method of claim 11, wherein the excitation control reduces dissipation in the charge transfer between one or more vibronic energy levels of redox species and the third electrode.

14. The method of claim 10, wherein the first, second, and third electrodes are a reference electrode, a counter electrode, and a working electrode of a potentiostat, respectively.

15. The method of claim 10, further comprising detecting, via a current detection system, a current associated with the second electrode.

16. The method of claim 15, wherein the current associated with the second electrode is indicative of an analyte in the electrochemical system.

* * * * *